(12) United States Patent
Tu et al.

(10) Patent No.: US 11,686,848 B2
(45) Date of Patent: Jun. 27, 2023

(54) SYSTEMS AND METHODS FOR TRAINING OBJECT DETECTION MODELS USING ADVERSARIAL EXAMPLES

(71) Applicant: UATC, LLC, San Francisco, CA (US)

(72) Inventors: Xuanyuan Tu, Milton (CA); Sivabalan Manivasagam, Toronto (CA); Mengye Ren, Toronto (CA); Ming Liang, Toronto (CA); Bin Yang, Toronto (CA); Raquel Urtasun, Toronto (CA)

(73) Assignee: UATC, LLC, Mountain View, CA (US)

( * ) Notice: Subject to any disclaimer, the term of this patent is extended or adjusted under 35 U.S.C. 154(b) by 293 days.

(21) Appl. No.: 17/007,651

(22) Filed: Aug. 31, 2020

(65) Prior Publication Data

US 2021/0303922 A1    Sep. 30, 2021

Related U.S. Application Data

(60) Provisional application No. 63/021,942, filed on May 8, 2020, provisional application No. 62/936,421, filed on Nov. 16, 2019.

(51) Int. Cl.
*G01S 17/931* (2020.01)
*G06N 20/00* (2019.01)
(Continued)

(52) U.S. Cl.
CPC .............. *G01S 17/89* (2013.01); *G01S 17/42* (2013.01); *G01S 17/894* (2020.01);
(Continued)

(58) Field of Classification Search
CPC .... G06K 9/6256; G06K 9/6262; G06N 20/00; G01S 17/931
See application file for complete search history.

(56) References Cited

U.S. PATENT DOCUMENTS 11,138,745 B2 * 10/2021 Vallespi-Gonzalez ....................... G06N 20/20
11,221,413 B2 * 1/2022 Liang ..................... G01S 17/86

OTHER PUBLICATIONS

Alzantot et al., "GenAttack: Practical Black-box Attacks with Gradient-Free Optimization", Proceedings of the Genetic and Evolutionary Computation Conference, Jul. 13-17, 2019, Prague, Czech Republic, pp. 1111-1119.

(Continued)

*Primary Examiner* — Bryan Bui
(74) *Attorney, Agent, or Firm* — Dority & Manning, P.A.

(57) ABSTRACT

Systems and methods for training object detection models using adversarial examples are provided. A method includes obtaining a training scene and identifying a target object within the training scene. The method includes obtaining an adversarial object and generating a modified training scene based on the adversarial object, the target object, and the training scene. The modified training scene includes the training scene modified to include the adversarial object placed on the target object. The modified training scene is input to a machine-learned model configured to detect the training object. A detection score is determined based on whether the training object is detected, and the machine-learned model and the parameters of the adversarial object are trained based on the detection output. The machine-learned model is trained to maximize the detection output. The parameters of the adversarial object are trained to minimize the detection output.

20 Claims, 11 Drawing Sheets

(51) Int. Cl.

| | |
|---|---|
| *G01S 17/89* | (2020.01) |
| *G01S 17/42* | (2006.01) |
| *G01S 17/894* | (2020.01) |
| *G06V 20/56* | (2022.01) |
| *G06V 20/64* | (2022.01) |
| *G06F 18/214* | (2023.01) |
| *G06F 18/21* | (2023.01) |
| *G06V 10/764* | (2022.01) |
| *G06V 10/82* | (2022.01) |

(52) U.S. Cl.
CPC .......... *G01S 17/931* (2020.01); *G06F 18/214* (2023.01); *G06F 18/217* (2023.01); *G06N 20/00* (2019.01); *G06V 10/764* (2022.01); *G06V 10/82* (2022.01); *G06V 20/56* (2022.01); *G06V 20/64* (2022.01); *G06V 2201/07* (2022.01); *G06V 2201/08* (2022.01)

(56) References Cited

OTHER PUBLICATIONS

Athalye et al., "Synthesizing Robust Adversarial Examples", arXiv:1707.07397v3, Jun. 7, 2018, 19 pages.
Bagautdinov et al., "Modeling Facial Geometry using Compositional VAEs", Conference on Computer Vision and Pattern Recognition, Jun. 18-22, 2018, Salt Lake City, UT, pp. 3877-3886.
Brendel et al., "Decision-Based Adversarial Attacks: Reliable Attacks Against Black-Box Machine Learning Models", International Conference on Learning Representations, Apr. 30-May 3, 2018, Vancouver, Canada, 12 pages.
Brown et al., "Adversarial Patch", arXiv:1712.09665v1, Dec. 27, 2017, 6 pages.
Cao et al., "Adversarial Objects Against LiDAR-Based Autonomous Driving Systems", arXiv:1907.05418v1, Jul. 11, 2019, 14 pages.
Cao et al., "Adversarial Sensor Attack on LiDAR-based Perception in Autonomous Driving", arXiv:1907.06826v2, Aug. 20, 2019, 15 pages.
Carlini et al., "Towards Evaluating the Robustness of Neural Networks", arXiv:1608.04644v2, Mar. 22, 2017, 19 pages.
Chang et al., "ShapeNet: An Information-Rich 3D Model Repository", arXiv:1512.03012v1, Dec. 9, 2015, 11 pages.
Chen et al., "ZOO: Zeroth Order Optimization Based Black-box Attacks to Deep Neural Networks without Training Substitute Models", AISec'17: Workshop of Artificial Intelligence and Security, Nov. 3, 2017, Dallas, TX, pp. 15-26.
Cignoni et al., "MeshLab: an Open-Source Mesh Processing Tool", Eurographics Italian Chapter Conference, Jul. 2-4, 2008, Salerno, Italy, pp. 129-136.
Engelmann et al., "SAMP: Shape and Motion Priors for 4D Vehicle Reconstruction", arXiv:2005.00922v1, May 2, 2020, 9 pages.
Eykholt et al., "Robust Physical-World Attacks on Deep Learning Visual Classification", Conference on Computer Vision and Pattern Recognition, Jun. 18-22, 2018, Salt Lake City, UT, pp. 1625-1634.
Geiger et al., "Are we ready for Autonomous Driving? The KITTI Vision Benchmark Suite", IEEE Conference on Computer Vision and Pattern Recognition, Jun. 18-20, 2012, Providence, Rhode Island, pp. 3354-3361.
Goodfellow et al., "Explaining and Harnessing Adversarial Examples", arXiv:1412.6572v3, Mar. 20, 2015, 11 pages.
Hughes et al., Computer Graphics: Principles and Practice Third Edition, Addison-Wesley, Reading, MA, 1995, 198 pages.
Kato et al., "Neural 3D Mesh Renderer", arXiv:1711.07566v1, Nov. 20, 2017, 17 pages.
Kurakin et al., "Adversarial Examples in the Physical World", International Conference on Learning Representations, Apr. 24-26, 2017, Toulon, France, 14 pages.
Lang et al., "PointPillars: Fast Encoders for Object Detection from Point Clouds", Conference on Computer Vision and Pattern Recognition, Jun. 16-20, 2019, Long Beach, CA, pp. 12697-12705.
Liang et al., "Multi-Task Multi-Sensor Fusion for 3D Object Detection", Conference on Computer Vision and Pattern Recognition, Jun. 16-20, 2019, Long Beach, CA, pp. 7345-7353.
Liao et al., "Defense against Adversarial Attacks Using High-Level Representation Guided Denoiser", Conference on Computer Vision and Pattern Recognition, Jun. 18-22, 2018, Salt Lake City, UT, pp. 1778-1787.
Litany et al., "Deformable Shape Completion with Graph Convolutional Autoencoders", Conference on Computer Vision and Pattern Recognition, Jun. 18-22, 2018, Salt Lake City, UT, pp. 1886-1895.
Liu et al., "Adversarial point perturbations on 3D objects", arXiv:1908.06062v1, Aug. 16, 2019, 17 pages.
Liu et al., "Beyond Pixel Norm-Balls: Parametric Adversaries using an Analytically Differentiable Renderer", International Conference on Learning Representations, May 6-9, 2019, New Orleans, Louisiana, 21 pages.
Liu et al., "Soft Rasterizer: Differentiable Rendering for Unsupervised Single-View Mesh Reconstruction", arXiv:1901.05567v2, Jan. 23, 2019, 10 pages.
Madry et al., "Towards Deep Learning Models Resistant to Adversarial Attacks", International Conference on Learning Representations, Apr. 30-May 3, 2018, Vancouver, Canada, 23 pages.
Moller et al., "Fast, Minimum Storage Ray/Triangle Intersection", Journal of Graphics Tools, vol. 2, No. 1, 1997, 7 pages.
Moosavi-Dezfooli et al., "DeepFool: a simple and accurate method to fool deep neural networks", Conference on Computer Vision and Pattern Recognition, Jun. 26-Jul. 1, 2016, pp. 2574-2582.
Papernot et al., "Practical Black-Box Attacks against Machine Learning", ASIA CCS '17, Apr. 2-6, 2017, Abu Dhabi, United Arab Emirates, pp. 506-519.
Qi et al., "PointNet: Deep Learning on Point Sets for 3D Classification and Segmentation", Conference on Computer Vision and Pattern Recognition, Jul. 21-26, 2017, Honolulu, Hawaii, pp. 652-660.
Qi et al., "PointNet++: Deep Hierarchical Feature Learning on Point Sets in a Metric Space", Conference on Neural Information Processing Systems, Dec. 4-9, 2017, Long Beach, CA, 10 pages.
Raghunathan et al., "Certified Defenses Against Adversarial Examples", International Conference on Learning Representations, Apr. 30-May 3, 2018, Vancouver, Canada, 15 pages.
Schott et al., "Towards the First Adversarially Robust Neural Network Model on MNIST", International Conference on Learning Representations, May 6-9, 2019, New Orleans, Louisiana, 17 pages.
Shi et al., "PointRCNN: 3D Object Proposal Generation and Detection from Point Cloud", Conference on Computer Vision and Pattern Recognition, Jun. 16-20, 2019, Long Beach, CA, pp. 770-779.
Szegedy et al., "Intriguing properties of neural networks", arXiv:1312.6199v4, Feb. 19, 2014, 10 pages.
Wicker et al., "Robustness of 3D Deep Learning in an Adversarial Setting", Conference on Computer Vision and Pattern Recognition, Jun. 16-20, 2019, Long Beach, CA, pp. 11767-11775.
Wong et al., "Provable Defenses against Adversarial Examples via the Convex Outer Adversarial Polytope", International Conference on Machine Learning, Jul. 10-15, 2018, Stockholm, Sweden, 10 pages.
Xiang et al., "Generating 3D Adversarial Point Clouds", Conference on Computer Vision and Pattern Recognition, Jun. 16-20, 2019, Long Beach, CA, pp. 9136-9144.
Xie et al., "Adversarial Examples for Semantic Segmentation and Object Detection", International Conference on Computer Vision, Oct. 22-29, 2017, Venice, Italy, pp. 1369-1378.
Yang et al., "Adversarial Attack and Defense on Point Sets", arXiv:1902.10899v1, Feb. 28, 2019, 14 pages.
Yang et al., "PIXOR: Real-time 3D Object Detection from Point Clouds", Conference on Computer Vision and Pattern Recognition, Jun. 18-22, 2018, Salt Lake City, UT, pp. 7652-7660.

(56) References Cited

OTHER PUBLICATIONS

Zeng et al., "Adversarial Attacks Beyond the Image Space", Conference on Computer Vision and Pattern Recognition, Jun. 16-20, 2019, Long Beach, CA, pp. 4302-4311.
Zheng et al., "PointCloud Saliency Maps", International Conference on Computer Vision, Oct. 27-Nov. 2, 2019, Seoul, Korea, pp. 1598-1606.
Zhou et al., "VoxelNet: End-to-End Learning for Point Cloud Based 3D Object Detection", Conference on Computer Vision and Pattern Recognition, Jun. 18-22, 2018, Salt Lake City, UT, pp. 4490-4499.

* cited by examiner

SYSTEMS AND METHODS FOR TRAINING OBJECT DETECTION MODELS USING ADVERSARIAL EXAMPLES

RELATED APPLICATION

The present application is based on and claims benefit of U.S. Provisional Patent Application No. 63/021,942 having a filing date of May 8, 2020, and U.S. Provisional Patent Application No. 62/936,421 having a filing date of Nov. 16, 2019, both of which are incorporated by reference herein.

FIELD

The present disclosure relates generally to vehicle perception and testing. In particular, the present disclosure relates to machine-learned models training techniques that can be used with, for example, autonomous vehicles.

BACKGROUND

Robots, including autonomous vehicles, can receive data that is used to perceive an environment through which the robot can travel. Robots can rely on machine-learned models to detect objects with an environment. The effective operation of a robot can depend on accurate object detection provided by the machine-learned models. Various machine-learned training techniques can be applied to improve such object detection.

SUMMARY

Aspects and advantages of embodiments of the present disclosure will be set forth in part in the following description, or may be learned from the description, or may be learned through practice of the embodiments.

Aspects of the present disclosure are directed to a method for training object detection models using adversarial examples. The method can include obtaining data indicative of a training scene. The data can include a plurality of three-dimensional scene datapoints representing an environment. The method can include identifying a target object within the training scene. The target object can be represented by a plurality of three-dimensional target object datapoints. The method can include obtaining an adversarial object representation including a plurality of three-dimensional adversarial object datapoints. The method can include generating data indicative of a modified training scene based, at least in part, on the training scene, the target object, and the adversarial object. The modified training scene can include a three-dimensional representation of the adversarial object on the target object. The method can include inputting the data indicative of the modified training scene to a machine-learned object detection model. And, the method can include determining a detection score associated with the modified scene based, at least in part, on an output of the machine-learned object detection model.

Another aspect of the present disclosure is directed to a computing system for training object detection models using adversarial examples. The computing system can include one or more processors and one or more non-transitory computer-readable media that collectively store instructions that, when executed by the one or more processors, cause the system to perform operations. The operations can include obtaining data indicative of a training scene. The training scene can include a plurality of three-dimensional scene datapoints representing an environment. The operations can include identifying a target object within the training scene. The target object can be represented by a plurality of three-dimensional target object datapoints. The operations can include obtaining an adversarial object represented by a plurality of three-dimensional adversarial object datapoints. The operations can include generating data indicative of a modified training scene based, at least in part, on the training scene, the target object, and the adversarial object. The modified training scene can include a three-dimensional representation of the adversarial object on the target object. The operations can include determining a detection score by inputting the modified training scene to a machine-learned object detection model. And, the operations can include training the machine-learned object detection model based, at least in part, on the detection score.

An additional aspect of the present disclosure is directed to another computing system for training object detection models using adversarial examples. The computing system can include a training database including scene data and data indicative of an adversarial object. The scene data can include a plurality of training scenes, each training scene including a plurality of three-dimensional datapoints representing an environment. The computing system can include a machine-learned object detection model configured to receive a respective training scene of the plurality of training scenes, and in response to receipt of the respective training scene, output a respective detection output indicative of one or more training objects within the respective training scene. The computing system can include a memory that stores a set of instructions and one or more processors which are configured to use the set of instructions to: obtain data indicative of a first training scene and the adversarial object from the training database, identify a first target object within the first training scene, and generate a first modified training scene based, at least in part, on the first training scene, the first training object, and the adversarial object. The first modified training scene can include a three-dimensional representation of the adversarial object on the first target object within the first training scene. The computing system can be further configured to determine a detection score by inputting the first modified training scene to the machine-learned object detection model and generate an updated adversarial object by updating one or more of a plurality of adversarial object parameters of the adversarial object based, at least in part, on the detection score.

Other example aspects of the present disclosure are directed to other systems, methods, vehicles, apparatuses, tangible non-transitory computer-readable media, and devices for training models using adversarial examples. These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

The autonomous vehicle technology described herein can help improve the safety of passengers of an autonomous vehicle, improve the safety of the surroundings of the autonomous vehicle, improve the experience of the rider and/or operator of the autonomous vehicle, as well as provide other improvements as described herein. Moreover, the autonomous vehicle technology of the present disclosure can help improve the ability of an autonomous vehicle to effectively provide vehicle services to others and support the various members of the community in which the autonomous vehicle is operating, including persons with reduced mobility and/or persons that are underserved by other transportation options. Additionally, the autonomous vehicle of the present disclosure may reduce traffic congestion in communities as well as provide alternate forms of transportation that may provide environmental benefits.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
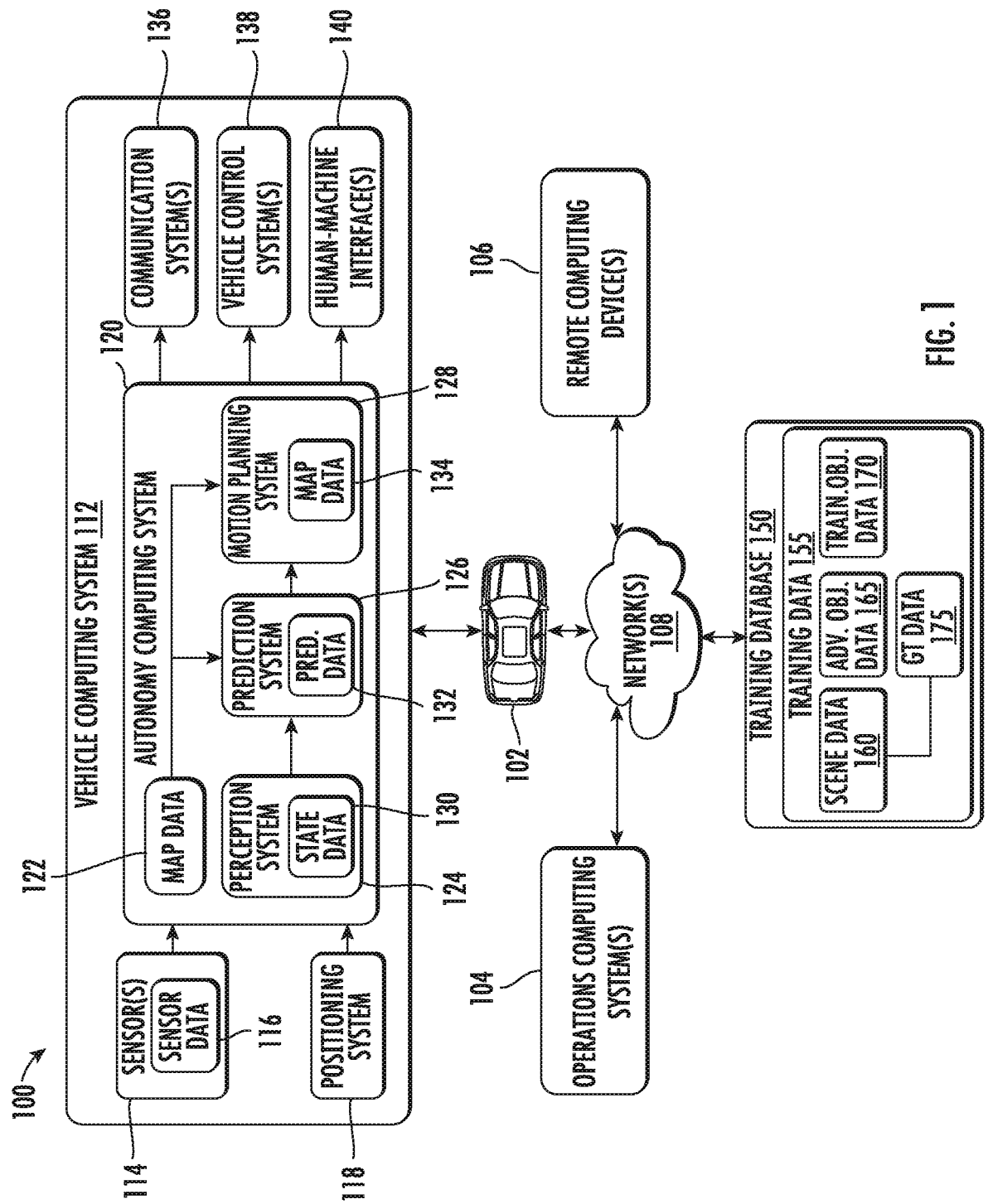
FIG. 1 depicts a block diagram of an example system according to example implementations of the present disclosure.

Aspects of the present disclosure are directed to improved systems and methods for training machine-learning models such as, for example, perception models for object detection in the autonomous vehicle context using adversarial examples. An autonomy system for an autonomous vehicle can be configured to detect objects within an environment of a vehicle. To do so, the system can utilize various object detection machine-learned models (e.g., deep neural networks) capable of detecting objects within a three-dimensional representation of an environment (e.g., a LiDAR scene). The object detection models, for example, can be configured to receive a LiDAR point cloud including a number of three-dimensional points (e.g., LiDAR points) depicting the three-dimensional representation of the environment and, in response, output an indication (e.g., a bounding box, classification, etc.) of one or more objects within the environment. The accuracy of the models (e.g., how many objects in the environment the model can detect) can depend, in part, on the training data used to learn the model. For this reason, objects within the environment can be missed due to data augmentation or uncommon roadway scenarios. As described herein, a universal adversarial object can be used to increase the accuracy of object detection models by simulating uncommon roadway scenarios and/or data augmentation during training.

A computing system can store an adversarial object (e.g., a mesh, voxel, implicit surfaces, etc.) defined by a plurality of three-dimensional parameters. The computing system can obtain data indicative of a training scene from a database of training scenes, identify a target object within the training scene, and modify the training scene to include a three-dimensional representation of the adversarial object on the target object. The computing system can input the modified training scene to a machine-learned object detection model (e.g., one or more deep neural networks) to determine whether the target object is detected by the object detection model. The computing system can update the parameters of the adversarial object to lower the object detection model's confidence that the training object is within the training scene. This process can be repeated for a number of different objects within a number of different training scenes to obtain a universal adversarial object that is scene or object agnostic (e.g., can effectively hide any object in any scene).

The computing system can use the universal adversarial object to train object detection models. For instance, the computing system can input a number training scenes modified with the universal adversarial object into the object detection models to determine a detection score (e.g., a score indicative of whether objects modified by the universal adversarial object are detected and/or properly classified). The computing system can train the object detection model to maximize the detection score. In this manner, the object detection model can be trained to defend against data augmentation and uncommon roadway scenarios as represented by the universal adversarial model. The universal adversarial object can be realized by learning the parameters of the object over a number of different three-dimensional scenes and objects within the scenes. This, in turn, enables the reusability of a single object across a number of training scenes, thereby increasing the speed and efficiency of training object detection models by removing the need to determine a number of different scene specific objects for each training scene in a training set.

The following describes the technology of this disclosure within the context of an autonomous vehicle for example purposes only. As described herein, the technology described herein is not limited to an autonomous vehicle and can be implemented within other robotic and computing systems, such as those utilizing object detection machine-learned models.

An autonomous vehicle can include a computing system (e.g., a vehicle computing system) with a variety of components for operating with minimal and/or no interaction from a human operator. For example, the computing system can be located onboard the autonomous vehicle and include one or more sensors (e.g., cameras, Light Detection and Ranging (LiDAR), Radio Detection and Ranging (RADAR), etc.), an autonomy computing system (e.g., for determining autonomous navigation), one or more vehicle control systems (e.g., for controlling braking, steering, powertrain), etc. The autonomy computing system can include a number of sub-systems that cooperate to perceive the surrounding environment of the autonomous vehicle and determine a motion plan for controlling the motion of the autonomous vehicle.

The autonomy computing system can include a number of sub-systems that cooperate to perceive the surrounding environment of the autonomous vehicle and determine a motion plan for controlling the motion of the autonomous vehicle. For example, the autonomy computing system can include a perception system configured to perceive one or more objects within the surrounding environment of the autonomous vehicle, a prediction system configured to predict a motion of the object(s) within the surrounding environment of the autonomous vehicle, and a motion planning system configured to plan the motion of the autonomous vehicle with respect to the object(s) within the surrounding environment of the autonomous vehicle. In some implementations, one or more of the number of sub-systems can be combined into one system. For example, an autonomy computing system can include a perception/prediction system configured to perceive and predict a motion of one or more objects within the surrounding environment of the autonomous vehicle.

Each of the subsystems can utilize one or more machine-learned models. For example, a perception system, prediction system, etc. can perceive one or more object within the surrounding environment of the vehicle by inputting sensor data (e.g., LiDAR data, image data, voxelized LiDAR data, etc.) into one or more machine-learned models. By way of example, the autonomy system can detect one or more objects within the surrounding environment of the vehicle by including, employing, and/or otherwise leveraging one or more machine-learned object detection models. For instance, the one or more machine-learned object detection models can receive scene data (e.g., three-dimensional data depicting a three-dimensional representation of an environment) associated with one or more objects within the surrounding environment of the autonomous vehicle and detect the one or more objects within the surrounding environment based on the scene data. For example, the machine-learned object detection models can be previously trained to output a plurality of bounding boxes, classifications, etc. indicative of one or more of the one or more objects within a surrounding environment of the autonomous vehicle. In this manner, the autonomy system can perceive the one or more objects within the surrounding environment of the autonomous vehicle based, at least in part, on the one or more machine-learned object detection models.

The one or more machine-learned object detection models can be previously trained via one or more machine-learning techniques. In some implementations, the one or more machine-learned object detection models can be previously trained by one or more devices (e.g., remote servers, operations computing system, etc.) remote from the autonomous vehicle. For example, the one or more machine-learned object detection models can be learned by a training computing system over training data stored in a training database. The training data can include scene data, adversarial object data, and/or training object data.

For instance, the scene data can include a plurality of training scenes. Each respective training scene of the plurality of training scenes can include a plurality of three-dimensional scene datapoints (e.g., LiDAR datapoints) representing an environment. Each training scene, for example, can include a point cloud of three-dimensional points. For instance, a training scene can include a bird's eye view (BEV) LiDAR point cloud. The LiDAR point cloud can include a collection of points that represent a three-dimensional environment surrounding a vehicle. For instance, each scene datapoint can include a set of X, Y, and Z coordinates. The vehicle, for instance, can be placed at the center of the scene (e.g., with coordinates 0, 0, 0).

The environment can include a previously observed surrounding environment of an autonomous vehicle. For example, the training data can include a plurality of training scenes previously collected during one or more autonomous vehicle excursions. For instance, the one or more autonomous vehicles can be configured to operate within a plurality of different environments. During an excursion, the one or more vehicles can collect one or more training scenes, via one or more vehicle sensors (e.g., LiDAR sensors). The one or more training scenes can be stored onboard the one or more autonomous vehicles and/or remote from the one or more autonomous vehicles (e.g., in the training database of the training computing system).

The plurality of scene datapoints for each training scene can depict one or more training objects. For instance, the plurality of scene datapoints can include one or more training object point clouds. Each training object point cloud can include a plurality of spatially adjacent three-dimensional datapoints representing a single object. For instance, each object point cloud can include a plurality of three-dimensional training object datapoints representing a respective training object of one or more training objects within the training scene. The one or more training objects can include one or more road features (e.g., curbs, road signs, etc.), one or more background features (e.g., trees, buildings, etc.), one or more dynamic features (e.g., other vehicles, pedestrians, etc.), and/or any other feature relevant to the operation of vehicle.

In some implementations, each of the plurality training scenes can be associated with ground truth data. Ground truth data, for example, can include an indication of one or more training objects within a respective training scene. For instance, the ground truth data can include a plurality of three-dimensional bounding boxes, classifications, labelled point clouds, etc. By way of example, the ground truth data can include a plurality of bounding boxes indicative of each training object represented by a respective training scene. For example, the plurality of bounding boxes can include a respective bounding box for each respective training object represented by the training scene.

The adversarial object data can include data indicative of an adversarial object. For instance, the adversarial object data can include a plurality of three-dimensional adversarial object parameters that define the adversarial object. The adversarial object, for example, can include a universal adversarial object optimized to be inserted into a plurality of different training scenes to produce an adversarial effect. For example, an adversarial object can be hidden within the scene, cause a machine-learned detection model to misclassify it, etc. In addition, as described in detail herein, the adversarial object can be placed within the scene to hide another object (e.g., a target object). In this manner, an adversarial object can, in effect, create an "invisible object."

The adversarial object can include a three-dimensional object parameterized by one or more voxels, meshes, implicit surfaces, etc. For instance, in some implementations, the adversarial object can include a three-dimensional mesh defined by a plurality of three-dimensional mesh parameters. For example, the three-dimensional object can include a plurality of polygons defined by a plurality of three-dimensional reference points. The reference points, for example, can include points along respective X, Y, and Z axes that define the height, width, and relative depth of a polygon. In some implementations, the plurality of mesh parameters can define an initial adversarial object template.

The template, for example, can include an isotropic sphere and/or one or more other common object shapes such as, for example, a couch, a canoe, a table, cabinet, chair, bike, etc. By way of example, the template can include a unit isotropic sphere with 162 vertices and 320 faces. In this manner, the adversarial object model can benefit from compact representations that allow for efficient and precise rendering, for example, in three-dimensional point clouds. Given an adversarial mesh, a computing system can compute exact intersections of rays analytically and in a differentiable manner, thereby allowing the computing system to take gradients efficiently (e.g., for white box attacks). Moreover, an adversarial mesh can have high-fidelity shape generation results (e.g., on faces, bodies, etc.).

The machine-learned object detection models can be trained in one or more remote devices using the plurality of training scenes and the adversarial object. For instance, in some implementations, the machine-learned object detection models can be trained by a training computing system remote from the autonomous vehicle. By way of example, the training computing system can include and/or be a component of an operations computing system configured to monitor and communicate with an autonomous vehicle. In addition, or alternatively, the training computing system can include and/or be a component of one or more remote computing devices such as, for example, one or more remote servers configured to communicate with an autonomous vehicle.

The training computing system can include the training database and at least one machine-learned object detection model. The machine-learned object detection model can be configured to receive a respective training scene of the plurality of training scenes from the training database. In response to receipt of the respective training scene, the model can output a respective detection output indicative of one or more training objects within the respective training scene. The machine-learned object detection model can include any machine-learned model (e.g., deep neural networks, convolutional neural networks, recurrent neural networks, recursive neural networks, decision trees, logistic regression models, support vector machines, etc.). In some implementations, the machine-learned object detection model can include one or more deep neural networks such as, for example, the PIXOR detection network, PIXOR (density) network, PointRCNN, or PointPillar network. The one or more deep neural networks can be trained to maximize a detection score indicative of one or more objects detected in a scene. The training computing system can include a memory that stores the training database, the machine-learned object detection models, and a set of instructions. In addition, the training computing system can include one or more processors which can be configured to use the set of instructions to train the machine-learned object detection models.

To do so, the training computing system can obtain data indicative of a first training scene and the adversarial object from the training database. For example, the training computing system can obtain data indicative of a training scene including a plurality of three-dimensional scene datapoints representing an environment. In addition, or alternatively, the training computing system can obtain an adversarial object defined by a plurality of three-dimensional adversarial object parameters. In some implementations, the training computing system can apply box constraints to the adversarial object model (e.g., one or more mesh vertices of the adversarial object model) based on the training scene and/or one or more training objects of the training scene to ensure physical feasibility.

The training computing system can identify a target object within the training scene. For example, the training computing system can identify the target object based on the one or more training object point clouds of the training scene. By way of example, the target object can be represented by a plurality of three-dimensional target object datapoints of the plurality of three-dimensional scene datapoints. The plurality of three-dimensional target object datapoints can include a respective training object point cloud of the plurality of three-dimensional scene datapoints. The training computing system can select the target object (e.g., the plurality of three-dimensional target object datapoints) from the one or more training objects (e.g., one or more training object point clouds) within the training scene. For instance, in some implementations, the target object can be randomly selected from the one or more training objects represented by the training scene.

The training computing system can generate data indicative of a modified training scene based on the training scene, the target object, and/or the adversarial object. For instance, the training computing system can obtain an adversarial object representation including a plurality of three-dimensional adversarial object datapoints. The modified training scene can include a three-dimensional representation of the adversarial object (e.g., as indicated by the plurality of three-dimensional adversarial object datapoints) relative to the target object within the training scene. By way of example, the three-dimensional representation of the adversarial object can include the plurality of three-dimensional adversarial datapoints localized within the training scene relative to the target object. The modified training scene can include a three-dimensional representation of the adversarial object on the target object within the training scene. For instance, the adversarial object can be located on the roof of the vehicle.

For example, the training computing system can determine an adversarial location for the adversarial object within the training scene based on the target object. The adversarial location for the adversarial object, for example, can include a location within the scene relative to the training object. By way of example, the adversarial location can include a top, side, bottom, etc. portion of the training object. The training computing system can determine the respective portion of the training object by comparing the plurality of three-dimensional target datapoints to the training object data of the training database.

For example, in some implementations, the training database can include a plurality of training object representations. Each training object representations can include an object type (e.g., vehicle type (e.g., cars, motorcycles, bicycles, etc.), pedestrian type, etc.) and can be defined by a plurality of three-dimensional training object parameters. In some implementations, each training object representation can include a computer-aided design ("CAD") model representing a specific object. For instance, the training database can include a library of object representations, each representation including a CAD model representing a specific object. The training computing system can obtain a plurality of training object representations from the training database based on the target object. For example, the target object can include a vehicle within the training scene. In such a case, the training computing system can obtain a plurality of training object representations of a vehicle type. The vehicle training object representations can include various vehicle representations, each defined by a plurality of three-dimensional training object parameters.

The training computing system can generate a target representation defined by a plurality of three-dimensional target representation parameters by comparing the plurality of three-dimensional target object datapoints to the plurality of three-dimensional training object parameters of one or more of the plurality of training object representations. For example, the training computing system can fit one or more training object representations to the plurality of three-dimensional target object datapoints (e.g., the point cloud defining the target object). For example, the plurality of training object representations can be represented as signed distance functions (SDFs), denoted as $F(\bullet; \theta)$. The training computing system can project the plurality of training object representations into a latent space using principal components analysis ("PCA"). The training computing system can optimize the latent code z such that all ground truth vehicle points evaluate as close to 0 as possible. Given a target object bounding box (x, y, w, h, $\alpha$), and a set of points P={p: p∈ $\mathbb{R}$ } within the box, the training computing system can find the optimal latent code z* such that:

$$z^* = \arg\min \Sigma_{p\in P} F(p; \theta(z))2$$

The training computing system can apply marching cubes on $F(\bullet; \theta(z^*))$ to obtain a fitted target object representation. The training computing system can identify the adversarial location for the adversarial object based on the target object representation. The training computing system can aim to add the adversarial object to the scene in a realistic manner. For example, in some implementations, the adversarial location can include a roof of the vehicle. By way of example, the training computing system can be configured to identify the roof of the training object by using vertices within the top 0.2 m vertical range of the target representation to approximate the roof region. This can be beneficial as the roof of a vehicle is more easily used for storage due to gravity and does not interfere with adjacent traffic in real world settings. Moreover, in virtual settings, objects on top of a vehicle are not prone to occlusion, whereas areas like the front hood or trunk top cannot be seen if there is another vehicle blocking the target vehicle. In addition, realistic scenarios exist, as it is common to strap furniture, canoes, bicycles, and other large items on top of a vehicle.

The training computing system can obtain the adversarial object representation including the plurality of three-dimensional adversarial object datapoints based on the adversarial location and/or one or more adversarial object parameters of the adversarial object. For example, the training computing system can obtain an adversarial mesh representation of the adversarial object. The adversarial mesh representation can include a plurality of adversarial object parameters that define the adversarial object. The training computing system can render the adversarial mesh representation of the adversarial object into the plurality of three-dimensional adversarial object datapoints. By way of example, the plurality of three-dimensional adversarial object datapoints can be rendered into three-dimensional LiDAR points. The three-dimensional LiDAR points, for example, can be localized within the training scene at the adversarial location.

In some implementations, the training computing system can render the plurality of three-dimensional adversarial object datapoints by inputting the plurality of adversarial object parameters (e.g., as defined by the adversarial mesh representation) and/or the desired adversarial location of the adversarial object within the training scene into a LiDAR renderer. The LiDAR renderer, for example, can use the adversarial location of the adversarial object within the training scene to sample nearby rays $\gamma$ with the same angular frequency as the LiDAR sensor used to generate the training scene. Given rays $\gamma$ and the adversarial object parameters Z, the training computing system (e.g., via the LiDAR render) can render a plurality of three-dimensional adversarial object datapoints with a differentiable raycaster R. The training computing system can compute the intersection of rays and mesh faces with a Moller-Trumbore intersection algorithm.

The training computing system can generate a union of the plurality of three-dimensional scene datapoints and the plurality of three-dimensional adversarial datapoints. For instance, the training computing system can take the union of the plurality of three-dimensional scene datapoints and the plurality of rendered three-dimensional adversarial datapoints to create the modified training scene. For example, the adversarial object parameters Z can be placed with a fixed pose relative to the roof center of the target object. Given a target object bounding box (x, y, w, h, $\alpha$), the training computing system can compute the roof center (rx, ry, rz) and apply the transformation matrix:

$$T = \begin{bmatrix} \cos\alpha & -\sin\alpha & 0 & r_x \\ \sin\alpha & \cos\alpha I & 0 & r_y \\ 0 & 0 & 1 & r_z \\ 0 & 0 & 0 & 1 \end{bmatrix}$$

on the adversarial object parameters.

The training computing system can determine a detection score associated with the modified training scene. For example, the training computing system can input the data indicative of the modified training scene to a machine-learned object detection model. The training computing system can determine the detection score associated with the modified training scene based on the output of the machine-learned object detection model. For example, the machine-learned object detection model can be configured to detect the one or more training objects within the training scene. The training computing system can input the modified training scene to the machine-learned object detection model to obtain a detection output indicative of one or more detected training objects represented by the modified training scene as an output of the machine-learned object detection model. The detection score can be indicative of a confidence score of the machine-learned object detection model in detection the target object.

The training computing system can determine that the one or more detected training objects do not include the target object. For example, the training computing system can compare the detection output to ground truth data associated with the modified training scene (e.g., the training scene that was modified by the adversarial object) to determine whether the one or more detected training object include the target object. In this manner, the training computing system can determine that the machine-learned object detection model did and/or did not detect the target object within the modified training scene based on the output of the machine-learned object detection model. In response to determining that the one or more detected training objects do not include the target object (i.e., that the machine-learned model did not detect the target object), the training computing system can lower the detection score. In addition, or alternatively, the training computing system can raise the detection score in response to determining that the one or more detected training objects include the target object.

In some implementations, the training computing system can determine an overall loss based on the detection score. The overall loss function can include a combination of an adversarial loss (e.g., based on the detection score) and a Laplacian loss for mesh smoothness. The training computing system can update one or more of the plurality of three-dimensional adversarial object parameters associated with the adversarial object based, at least in part, on the detection score. For example, one or more of the plurality of three-dimensional adversarial object parameters can be updated to minimize the detection score (and/or minimize the overall loss function). As an example, the training computing system can generate an updated adversarial object (e.g., by updating the adversarial object parameters) by searching for a vertex perturbation v and global transformation parameters (R, t) that minimize the overall loss function.

By way of example, the training computing system can suppress all relevant bounding box proposals. A proposal can be relevant if 1) its confidence score is greater than 0.1 and 2) if its IoU with the groundtruth bounding box is also greater than 0.1. The training computing system can minimize the confidence of the relevant candidates:

$$\mathcal{L}_{adv} = \sum_{y,s \in Y} -IoU(y^*, y)\log(1-s),$$

where Y is the set of relevant bounding box proposals and each proposal y has a confidence score s. The training computing system can use binary cross entropy to minimize the confidence score of the relevant proposals, weighted by the IoU with the ground truth bounding box y*.

In addition, the Laplacian loss can be applied to regularize the mesh geometry and maintain surface smoothness of the adversarial object:

$$L_{lap} = \Sigma_i \|\delta_i\|_2^2,$$

where $\delta_i$ is the distance from $v_i$ to the centroid of its immediate neighbors N(i):

$$\delta_i = v_i - \frac{1}{\|N(i)\|} \sum_{j \in N(i)} v_j.$$

In some implementations, during learning of the adversarial object parameters, the training computing system can deform an adversarial object template by adding local learnable displacement vectors $\Delta v_i \in \mathbb{R}^3$ for each vertex and a global transformation for the entire adversarial object:

$$v_i = R(v_i^0 + \Delta v_i) + t,$$

where $v_i^0$ is the initial vertex position, and $R \in SO(3)$ is a global rotation matrix, and $t \in \mathbb{R}^3$ is a global translation vector. To ensure physical feasibility, box constraints can be applied to the adversarial object model parameters (e.g., mesh vertices of the adversarial mesh) as well as the global translation.

In some implementations, for example, where the adversarial object is initialized as an isotropic sphere, R can be fixed to be an identity matrix, since the sphere is rotation invariant. In addition, or alternatively, in some implementations, for example, where the adversarial object is initialized as a common object (e.g., couch, chair, canoe, etc.), the training computing system can deform the adversarial object model by constraining R to be rotation on the x-y plane:

$$R = \begin{matrix} \cos\theta & -\sin\theta & 0 \\ \sin\theta & \cos\theta & 0 \\ 0 & 0 & 1 \end{matrix}$$

where θ is the learnable rotation angle.

The adversarial object can be learned in a white box setting and/or a black box setting. For example, in a white box setting, the training computing system can simulate the addition of the adversarial object in a differentiable manner. For instance, the training computing system can take the gradient from the adversarial object $\mathcal{L}$ to the adversarial object parameters (e.g., mesh vertices of the adversarial mesh). In addition, the training computing system can reparameterize local and global displacement vectors to apply box constraints. For example, the training computing system can reparameterize adversarial object parameters (e.g., mesh vertices) to inherently obey box constraints:

$$v_i = R(b \odot \text{sign}(\tilde{v}_i^0) \odot \sigma(|\tilde{v}_i^0| + \Delta \tilde{v}_i)) + c \odot \tanh(\tilde{t}),$$

where ⊙ denotes element-wise multiplication, σ denotes the sigmoid function, $b \in \mathbb{R}^3$ define limits on size, and $c \in \mathbb{R}^3$ define limits on translation. $\sigma(\tilde{v}_i^0 = v_i^0/b$ is the normalized initial position of the vertex and $\tanh(\tilde{t}) = t/c$ is the normalized global translation. The sign function constrains each vertex to stay in the same quadrant where it is initialized.

In addition, or alternatively, the adversarial object can be learned in a black box setting. In a black box setting, the training computing system can employ a genetic algorithm to update the adversarial object parameters (e.g., mesh parameters) and use the inverse of the gradient from the adversarial object $-\mathcal{L}$ as the fitness score. The training computing system can jointly optimize the adversarial parameters of the adversarial object over a plurality of the training scenes in the training database. To do so, the training computing system can average queries over multiple training scenes to compute the fitness score at every step. In such a case, the training computing system can avoid reparameterization in gradient-free optimization.

In this manner, the training computing system can create a universal adversarial object. The universal adversarial object can be scene independent and thus can be used across a plurality of different training scenes. For example, the universal adversarial object can be used to hide different training objects at various orientations and location within various training scenes of the training database. For instance, a first, second, third, etc. training scene can be obtained from the computing system. The universal adversarial object can be used in any of the first, second, third, etc. training scenes to train a machine-learned object detection model.

By way of example, the training computing system can train the object detection machine-learned model based on the detection score. The machine-learned object detection model, for example, can be trained to maximize the detection score (and/or minimize the overall loss). To do so, the training computing system use random data augmentation as a defense mechanism. For example, the training computing system can randomly augment a plurality of training scenes (e.g., by generating a modified training scene as described herein) to be input into the machine-learned object detection model. During training, the training computing system can generate a random watertight mesh and place it on a random training object within a training scene (e.g., using the rooftop fitting methods described herein). To generate the random watertight mesh, the training computing system can sample a set of N vertices $V \in \mathbb{R}^{N \times 3}$ from a Gaussian $N(0,\sigma)$ and apply incremental triangulation to obtain a set of connected tetrahedrons Q. The training computing system can stochastically remove M boundary tetrahedrons that do not disconnect Q into separate components. The remaining boundary faces of Q can be used to obtain the watertight surface. The watertight surface can be used to augment a training scene in the manner described herein. The training computing system can update one or more model parameters of the machine-learned object detection model based on the defense mechanism. For instance, the training computing system can update the one or more model parameters of the machine-learned object detection model based at least in part on the detection score.

Example aspects of the present disclosure can provide a number of improvements to perception computing technology and robotics computing technology such as, for example, perception computing technology for autonomous driving. For instance, the systems and methods of the present disclosure provide an improved approach for training machine-learning object detection models such as those used to detect objects within a surrounding environment of a vehicle. For example, a computing system can obtain data indicative of a training scene including a plurality of three-dimensional scene datapoints representing an environment. The computing system can identify a target object within the training scene. The target object can be represented by a plurality of three-dimensional target object datapoints. The computing system can obtain an adversarial object representation including a plurality of three-dimensional adversarial object datapoints. The computing system can generate data indicative of a modified training scene based, at least in part, on the training scene, the target object, and/or the adversarial object. The modified training scene can include a three-dimensional representation of the adversarial object on the target object. The computing system can input the data indicative of the modified training scene to a machine-learned object detection model. The computing system can determine a detection score associated with the modified scene based, at least in part, on an output of the machine-learned object detection model. The computing system can update the adversarial object and/or the machine-learned object detection model based on the detection score. In this manner, the present disclosure presents an improved computing system that can effectively train a machine-learned model.

The computing system can accumulate and utilize newly available information in the form of a universal adversarial object to provide a practical improvement to machine-learning technology (e.g., machine-learning training technology). The robust, universal, and physically realistic adversarial object can be capable of hiding objects from LiDAR detectors. As a result, the computing system can expose vulnerabilities of state-of-the-art object detection models by modifying the LiDAR scenes with the universal adversarial object. The computing system can further improve such state-of-the-art object detection models by using the universal adversarial object to train the models to overcome the exposed vulnerabilities. The universal adversarial object is able to increase the speed and efficiency of training machine-learned models, generally, by considering multiple scenes (e.g., frames) and all objects within each scene during training. In this manner, the universal adversarial object is input agnostic and thus generally effective in a number of different environments. This, in turn, improves the functioning of machine-learning systems in general by increasing the speed and efficiency of training such systems. Ultimately, the training techniques disclosed herein result in more accurate machine-learned systems; thereby improving an autonomous vehicle's perception of its environment and enhancing the safety of self-driving systems under unseen conditions from limited training data, Furthermore, although aspects of the present disclosure focus on the application of training techniques described herein to object detection models utilized in autonomous vehicles, the systems and methods of the present disclosure can be used to train any machine-learned model. Thus, for example, the systems and methods of the present disclosure can be used to train machine-learned models configured for image processing, labeling, etc.

Various means can be configured to perform the methods and processes described herein. For example, a computing system can include data obtaining unit(s), identification unit(s), generation unit(s), inputting unit(s), scoring unit(s), storing unit(s), training unit(s), and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry, for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means (e.g., data obtaining unit(s), etc.) can be configured to obtain data, for example, such as data indicative of a training scene. The data can include, for example, a plurality of three-dimensional scene datapoints representing an environment. In addition, or alternatively, the means (e.g., data obtaining unit(s), etc.) can be configured to obtain an adversarial object representation including a plurality of three-dimensional adversarial object datapoints.

The means (e.g., identification unit(s), etc.) can be configured to identify a target object within the training scene. The target object can be represented by a plurality of three-dimensional target object datapoints. The means (e.g., generation unit(s), etc.) can be configured to generate data indicative of a modified training scene based, at least in part, on the training scene, the target object, and/or the adversarial object. The modified training scene can include a three-dimensional representation of the adversarial object on the target object.

The means (e.g., inputting unit(s), etc.) can be configured to input the data indicative of the modified training scene to a machine-learned object detection model. The means (e.g., scoring unit(s), etc.) can be configured to determine a detection score associated with the modified scene based, at least in part, on an output of the machine-learned object detection model. The means (e.g., training unit(s), etc.) can be configured train the machine-learned object detection model and/or the adversarial object based on the detection score. For example, the means (e.g., training unit(s), etc.) can be configured to update one or more model parameters of the machine-learned object detection model based at least in part on the detection score. In addition, or alternatively, the means (e.g., training unit(s), etc.) can be configured to update one or more three-dimensional adversarial object parameters associated with the adversarial object based, at least in part, on the detection score. The one or more three-dimensional adversarial object parameters can be updated to minimize the detection score. The means (e.g., storing unit(s), etc.) can be configured to store the one or more updated parameters in a training database.

With reference now to FIGS. 1-11, example embodiments of the present disclosure will be discussed in further detail. FIG. 1 depicts an example system 100 overview according to example implementations of the present disclosure. More particularly, FIG. 1 illustrates a vehicle 102 (e.g., ground-based vehicle, bikes, scooters, and other light electric vehicles, etc.) including various systems and devices configured to control the operation of the vehicle. For example, the vehicle 102 can include an onboard vehicle computing system 112 (e.g., located on or within the autonomous vehicle) that is configured to operate the vehicle 102. Generally, the vehicle computing system 112 can obtain sensor data 116 from a sensor system 114 onboard the vehicle 102, attempt to comprehend the vehicle's surrounding environment by performing various processing techniques on the sensor data 116, and generate an appropriate motion plan 134 through the vehicle's surrounding environment.

As illustrated, FIG. 1 shows a system 100 that includes the vehicle 102; a communications network 108; an operations computing system 104; one or more remote computing devices 106; the vehicle computing system 112; one or more sensors 114; sensor data 116; a positioning system 118; an autonomy computing system 120; map data 122; a perception system 124; a prediction system 126; a motion planning system 128; state data 130; prediction data 132; motion plan data 134; a communication system 136; a vehicle control system 138; a human-machine interface 140; and a training database 150.

The operations computing system 104 can be associated with a service provider that can provide one or more vehicle services to a plurality of users via a fleet of vehicles that includes, for example, the vehicle 102. The vehicle services can include transportation services (e.g., rideshare services), courier services, delivery services, and/or other types of services.

The operations computing system 104 can include multiple components for performing various operations and functions. For example, the operations computing system 104 can be configured to monitor and communicate with the vehicle 102 and/or its users to coordinate a vehicle service provided by the vehicle 102. To do so, the operations computing system 104 can communicate with the one or more remote computing devices 106 and/or the vehicle 102 via one or more communications networks including the communications network 108. The communications network 108 can send and/or receive signals (e.g., electronic signals) or data (e.g., data from a computing device) and include any combination of various wired (e.g., twisted pair cable) and/or wireless communication mechanisms (e.g., cellular, wireless, satellite, microwave, and radio frequency) and/or any desired network topology (or topologies). For example, the communications network 108 can include a local area network (e.g. intranet), wide area network (e.g. the Internet), wireless LAN network (e.g., via Wi-Fi), cellular network, a SATCOM network, VHF network, a HF network, a WiMAX based network, and/or any other suitable communications network (or combination thereof) for transmitting data to and/or from the vehicle 102.

Each of the one or more remote computing devices 106 can include one or more processors and one or more memory devices. The one or more memory devices can be used to store instructions that when executed by the one or more processors of the one or more remote computing devices 106 cause the one or more processors to perform operations and/or functions including operations and/or functions associated with the vehicle 102 including sending and/or receiving data or signals to and from the vehicle 102, monitoring the state of the vehicle 102, and/or controlling the vehicle 102. The one or more remote computing devices 106 can communicate (e.g., exchange data and/or signals) with one or more devices including the operations computing system 104 and the vehicle 102 via the communications network 108.

The one or more remote computing devices 106 can include one or more computing devices such as, for example, one or more operator devices associated with one or more vehicle operators, user devices associated with one or more vehicle passengers, developer devices associated with one or more vehicle developers (e.g., a laptop/tablet computer configured to access computer software of the vehicle computing system 112), etc. One or more of the devices can receive input instructions from a user or exchange signals or data with an item or other computing device or computing system (e.g., the operations computing system 104). Further, the one or more remote computing devices 106 can be used to determine and/or modify one or more states of the vehicle 102 including a location (e.g., a latitude and longitude), a velocity, an acceleration, a trajectory, a heading, and/or a path of the vehicle 102 based in part on signals or data exchanged with the vehicle 102. In some implementations, the operations computing system 104 can include the one or more of the remote computing devices 106.

The vehicle 102 can be a ground-based vehicle (e.g., an automobile, a motorcycle, a train, a tram, a bus, a truck, a tracked vehicle, a light electric vehicle, a moped, a scooter, and/or an electric bicycle), an aircraft (e.g., airplane or helicopter), a boat, a submersible vehicle (e.g., a submarine), an amphibious vehicle, a hovercraft, a robotic device (e.g. a bipedal, wheeled, or quadrupedal robotic device), and/or any other type of vehicle. The vehicle 102 can be an autonomous vehicle that can perform various actions including driving, navigating, and/or operating, with minimal and/or no interaction from a human driver.

The vehicle 102 can include and/or be associated with the vehicle computing system 112. The vehicle computing system 112 can include one or more computing devices located onboard the vehicle 102. For example, the one or more computing devices of the vehicle computing system 112 can be located on and/or within the vehicle 102. As depicted in FIG. 1, the vehicle computing system 112 can include the one or more sensors 114; the positioning system 118; the autonomy computing system 120; the communication system 136; the vehicle control system 138; and the human-machine interface 140. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can exchange (e.g., send and/or receive) data, messages, and/or signals amongst one another via the communication channel.

The one or more sensors 114 can be configured to generate and/or store data including the sensor data 116 associated with one or more objects that are proximate to the vehicle 102 (e.g., within range or a field of view of one or more of the one or more sensors 114). The one or more sensors 114 can include one or more Light Detection and Ranging (LiDAR) systems, one or more Radio Detection and Ranging (RADAR) systems, one or more cameras (e.g., visible spectrum cameras and/or infrared cameras), one or more sonar systems, one or more motion sensors, and/or other types of image capture devices and/or sensors. The sensor data 116 can include image data, radar data, LiDAR data, sonar data, and/or other data acquired by the one or more sensors 114. The one or more objects can include, for example, pedestrians, vehicles, bicycles, buildings, roads, foliage, utility structures, bodies of water, and/or other objects. The one or more objects can be located on or around (e.g., in the area surrounding the vehicle 102) various parts of the vehicle 102 including a front side, rear side, left side, right side, top, or bottom of the vehicle 102. The sensor data 116 can be indicative of locations associated with the one or more objects within the surrounding environment of the vehicle 102 at one or more times. For example, sensor data 116 can be indicative of one or more LiDAR point clouds associated with the one or more objects within the surrounding environment. The one or more sensors 114 can provide the sensor data 116 to the autonomy computing system 120.

In addition to the sensor data 116, the autonomy computing system 120 can retrieve or otherwise obtain data including the map data 122. The map data 122 can provide detailed information about the surrounding environment of the vehicle 102. For example, the map data 122 can provide information regarding: the identity and/or location of different roadways, road segments, buildings, or other items or objects (e.g., lampposts, crosswalks and/or curbs); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); and/or any other map data that provides information that assists the vehicle computing system 112 in processing, analyzing, and perceiving its surrounding environment and its relationship thereto.

The vehicle computing system 112 can include a positioning system 118. The positioning system 118 can determine a current position of the vehicle 102. The positioning system 118 can be any device or circuitry for analyzing the position of the vehicle 102. For example, the positioning system 118 can determine a position by using one or more of inertial sensors, a satellite positioning system, based on IP/MAC address, by using triangulation and/or proximity to network access points or other network components (e.g., cellular towers and/or Wi-Fi access points) and/or other suitable techniques. The position of the vehicle 102 can be used by various systems of the vehicle computing system 112 and/or provided to one or more remote computing devices (e.g., the operations computing system 104 and/or the remote computing devices 106). For example, the map data 122 can provide the vehicle 102 relative positions of the surrounding environment of the vehicle 102. The vehicle 102 can identify its position within the surrounding environment (e.g., across six axes) based at least in part on the data described herein. For example, the vehicle 102 can process the sensor data 116 (e.g., LiDAR data, camera data) to match it to a map of the surrounding environment to get a determination of the vehicle's position within that environment (e.g., transpose the vehicle's position within its surrounding environment).

The autonomy computing system 120 can include a perception system 124, a prediction system 126, a motion planning system 128, and/or other systems that cooperate to perceive the surrounding environment of the vehicle 102 and determine a motion plan for controlling the motion of the vehicle 102 accordingly. For example, the autonomy computing system 120 can receive the sensor data 116 from the one or more sensors 114, attempt to determine the state of the surrounding environment by performing various processing techniques on the sensor data 116 (and/or other data), and generate an appropriate motion plan through the surrounding environment, including for example, a motion plan that navigates the vehicle 102 around the current and/or predicted locations of one or more objects detected by the one or more sensors 114. The autonomy computing system 120 can control the one or more vehicle control systems 138 to operate the vehicle 102 according to the motion plan.

The autonomy computing system 120 can identify one or more objects that are proximate to the vehicle 102 based at least in part on the sensor data 116 and/or the map data 122. For example, the perception system 124 can obtain state data 130 descriptive of a current and/or past state of an object that is proximate to the vehicle 102. The state data 130 for each object can describe, for example, an estimate of the object's current and/or past: location and/or position; speed; velocity; acceleration; heading; orientation; size/footprint (e.g., as represented by a bounding shape); class (e.g., pedestrian class vs. vehicle class vs. bicycle class), and/or other state information. The perception system 124 can provide the state data 130 to the prediction system 126 (e.g., for predicting the movement of an object).

The prediction system 126 can generate prediction data 132 associated with each of the respective one or more objects proximate to the vehicle 102. The prediction data 132 can be indicative of one or more predicted future locations of each respective object. The prediction data 132 can be indicative of a predicted path (e.g., predicted trajectory) of at least one object within the surrounding environment of the vehicle 102. For example, the predicted path (e.g., trajectory) can indicate a path along which the respective object is predicted to travel over time (and/or the velocity at which the object is predicted to travel along the predicted path). The prediction system 126 can provide the prediction data 132 associated with the one or more objects to the motion planning system 128. In some implementations, the perception and prediction systems 124, 126 (and/or other systems) can be combined into one system and share computing resources.

The motion planning system 128 can determine a motion plan and generate motion plan data 134 for the vehicle 102 based at least in part on the prediction data 132 (and/or other data). The motion plan data 134 can include vehicle actions with respect to the objects proximate to the vehicle 102 as well as the predicted movements. For instance, the motion planning system 128 can implement an optimization algorithm that considers cost data associated with a vehicle action as well as other objective functions (e.g., cost functions based on speed limits, traffic lights, and/or other aspects of the environment), if any, to determine optimized variables that make up the motion plan data 134. By way of example, the motion planning system 128 can determine that the vehicle 102 can perform a certain action (e.g., pass an object) without increasing the potential risk to the vehicle 102 and/or violating any traffic laws (e.g., speed limits, lane boundaries, signage). The motion plan data 134 can include a planned trajectory, velocity, acceleration, and/or other actions of the vehicle 102.

The motion planning system 128 can provide the motion plan data 134 with data indicative of the vehicle actions, a planned trajectory, and/or other operating parameters to the vehicle control systems 138 to implement the motion plan data 134 for the vehicle 102. For instance, the vehicle 102 can include a mobility controller configured to translate the motion plan data 134 into instructions. By way of example, the mobility controller can translate a determined motion plan data 134 into instructions for controlling the vehicle 102 including adjusting the steering of the vehicle 102 "X" degrees and/or applying a certain magnitude of braking force. The mobility controller can send one or more control signals to the responsible vehicle control component (e.g., braking control system, steering control system and/or acceleration control system) to execute the instructions and implement the motion plan data 134.

The vehicle computing system 112 can include the one or more human-machine interfaces 140. For example, the vehicle computing system 112 can include one or more display devices located on the vehicle computing system 112. A display device (e.g., screen of a tablet, laptop and/or smartphone) can be viewable by a user of the vehicle 102 that is located in the front of the vehicle 102 (e.g., driver's seat, front passenger seat). Additionally, or alternatively, a display device can be viewable by a user of the vehicle 102 that is located in the rear of the vehicle 102 (e.g., a back passenger seat). For example, the autonomy computing system 120 can provide one or more outputs including a graphical display of the location of the vehicle 102 on a map of a geographical area within one kilometer of the vehicle 102 including the locations of objects around the vehicle 102. A passenger of the vehicle 102 can interact with the one or more human-machine interfaces 140 by touching a touchscreen display device associated with the one or more human-machine interfaces to indicate, for example, a stopping location for the vehicle 102.

The vehicle computing system 112 can communicate data between the vehicle 102 and the human-machine interface 140. The data can be communicated to and/or from the vehicle 102 directly and/or indirectly (e.g., via another computing system). For example, in some implementations, the data can be communicated directly from the vehicle computing system 112 to the human-machine interface 140. In addition, or alternatively, the vehicle computing system 112 can communicate with the human-machine interface 140 indirectly, via another computing system, such as, for example, a system of a third party vehicle provider/vendor.

In some implementations, each of the autonomous subsystems (e.g., perception system 124, prediction system 126, motion planning system 128, etc.) can utilize one or more machine-learned models. For example, a perception system 124, prediction system 126, etc. can perceive one or more objects within the surrounding environment of the vehicle 102 by inputting sensor data 116 (e.g., LiDAR data, image data, voxelized LiDAR data, etc.) into one or more machine-learned models. By way of example, the autonomy system 120 can detect one or more objects within the surrounding environment of the vehicle 102 by including, employing, and/or otherwise leveraging one or more machine-learned object detection models. The one or more machine-learned object detection models can receive scene data (e.g., three-dimensional data depicting a three-dimensional representation of an environment) associated with one or more objects within the surrounding environment of the vehicle 102 and detect the one or more objects within the surrounding environment based on the scene data. For example, the machine-learned object detection models can be previously trained to output a plurality of bounding boxes, classifications, etc. indicative of one or more of the one or more objects within a surrounding environment of the vehicle 102. In this manner, the autonomy system 120 can perceive the one or more objects within the surrounding environment of the vehicle 102 based, at least in part, on the one or more machine-learned object detection models.

As described herein, with reference to the remaining figures, the one or more machine-learned object detection models can be previously trained via one or more machine-learning techniques. The machine-learned models can be previously trained by the one or more remote computing devices 106, the operations computing system(s) 104, and/or any other device (e.g., remote servers, training computing systems, etc.) remote from and/or onboard the vehicle 102. For example, the one or more machine-learned object detection models can be learned by a training computing system (e.g., one or more remote computing device(s) 106, the operations computing system(s) 104, etc.) over training data 155 stored in a training database 150. The training data 155 can include scene data 160, adversarial object data 165, training object data 170, and/or ground truth data 175.

The scene data 160 can include a plurality of training scenes. Each respective training scene of the plurality of training scenes can include a plurality of three-dimensional scene datapoints (e.g., LiDAR datapoints previously captured by one or more sensor(s) 114) representing an environment. Each training scene, for example, can include a point cloud of three-dimensional points. For instance, a training scene can include a bird's eye view (BEV) LiDAR point cloud. The LiDAR point cloud can include a collection of points that represent a three-dimensional environment surrounding a vehicle (e.g., vehicle 102). For instance, each scene datapoint can include a set of X, Y, and Z coordinates. The vehicle 102, for instance, can be placed at the center of the scene (e.g., with coordinates 0, 0, 0).

The environment can include a previously observed surrounding environment of vehicle 102. For example, the training data 155 can include a plurality of training scenes previously collected during one or more autonomous vehicle excursions. For instance, one or more autonomous vehicles (e.g., including vehicle 102) can be configured to operate within a plurality of different environments. During an excursion, the one or more vehicles (e.g., vehicle 102) can collect one or more training scenes, via one or more vehicle sensors (e.g., sensor(s) 114 such as LiDAR sensors). The one or more training scenes can be stored onboard the one or more autonomous vehicles and/or remote from the one or more autonomous vehicles (e.g., in the training database 150).

The plurality of scene datapoints for each training scene can depict one or more training objects. For instance, the plurality of scene datapoints can include one or more training object point clouds. Each training object point cloud can include a plurality of spatially adjacent three-dimensional datapoints representing a single object. For instance, each object point cloud can include a plurality of three-dimensional training object datapoints representing a respective training object of one or more training objects within the training scene. The one or more training objects can include one or more road features (e.g., curbs, road signs, etc.), one or more background features (e.g., trees, buildings, etc.), one or more dynamic features (e.g., other vehicles, pedestrians, etc.), and/or any other feature relevant to the operation of a vehicle.

The training object data 170 can include information for the one or more training objects. For example, the training object data 170 can include a plurality of training object representations. Each training object representation can include an object type (e.g., vehicle type (e.g., cars, motorcycles, bicycles, etc.), pedestrian type, etc.) and can be defined by a plurality of three-dimensional training object parameters. In some implementations, each training object representation can include a computer-aided design ("CAD") model representing a specific object. For instance, the training database 150 can include a library of object representations, each representation including a CAD model representing a specific object.

In some implementations, each of the plurality training scenes can be associated with ground truth data 175. Ground truth data 175, for example, can include an indication of one or more training objects within a respective training scene. For instance, the ground truth data 175 can include a plurality of three-dimensional bounding boxes, classifications, labelled point clouds, etc. By way of example, the ground truth data 175 can include a plurality of bounding boxes indicative of each training object represented by a respective training scene. For example, the plurality of bounding boxes can include a respective bounding box for each respective training object represented by the training scene. By way of example, the training data 155 can include a dataset for training and evaluation. The dataset can include LiDAR points clouds (e.g., scene data 160) and three-dimensional bounding box labels (e.g., ground truth data 175) for objects seen by the front camera (e.g., sensors) of an autonomous vehicle. Each bounding box label can include a point cloud with at least ten datapoints representing a vehicle object. This can result in 6864 vehicles in the training set and 6544 vehicles in a validation set.

The adversarial object data 165 can include data indicative of an adversarial object. For instance, the adversarial object data 165 can include a plurality of three-dimensional adversarial object parameters that define the adversarial object. The adversarial object, for example, can include a universal adversarial object optimized to be inserted into a plurality of different training scenes to produce an adversarial effect. An adversarial object can be hidden within the scene, for example, to cause a machine-learned detection model to misclassify it, etc. In addition, as described in detail herein, the adversarial object can be placed within the scene to hide another object (e.g., a target object). In this manner, an adversarial object can, in effect, create an "invisible object."

The adversarial object can include a three-dimensional object parameterized by one or more voxels, meshes, implicit surfaces, etc. For instance, in some implementations, the adversarial object data 165 can include a three-dimensional mesh defined by a plurality of three-dimensional mesh parameters. For example, the three-dimensional object can include a plurality of polygons defined by a plurality of three-dimensional reference points. The reference points, for example, can include points along respective X, Y, and Z axes that define the height, width, and relative depth of a polygon. In some implementations, the plurality of mesh parameters can define an initial adversarial object template. The template, for example, can include an isotropic sphere and/or one or more other common object shapes such as, for example, a couch, a canoe, a table, cabinet, chair, bike, etc. By way of example, the template can include a unit isotropic sphere with 162 vertices and 320 faces. In this manner, the adversarial object model (e.g., of the adversarial object data 165) can benefit from compact representations that allow for efficient and precise rendering, for example, in three-dimensional point clouds. Given an adversarial mesh, a computing system (e.g., a training computing system described with reference to FIG. 2) can compute exact intersections of rays analytically and in a differentiable manner, thereby allowing the computing system to take gradients efficiently (e.g., for white box attacks). Moreover, an adversarial mesh can have high-fidelity shape generation results (e.g., on faces, bodies, etc.).

The training data 155 (e.g., scene data 160, adversarial object data 165, training object data 170, and/or ground truth data 175) of the training database 150 can be used to train the various machine-learned models described herein. The machine-learned models, for example, can be trained in one or more remote computing devices 106, the operations computing system 104, a training computing system, etc. using a plurality of training scenes (e.g., scene data 160) and an adversarial object (e.g., adversarial object data 165).

Figure 2:
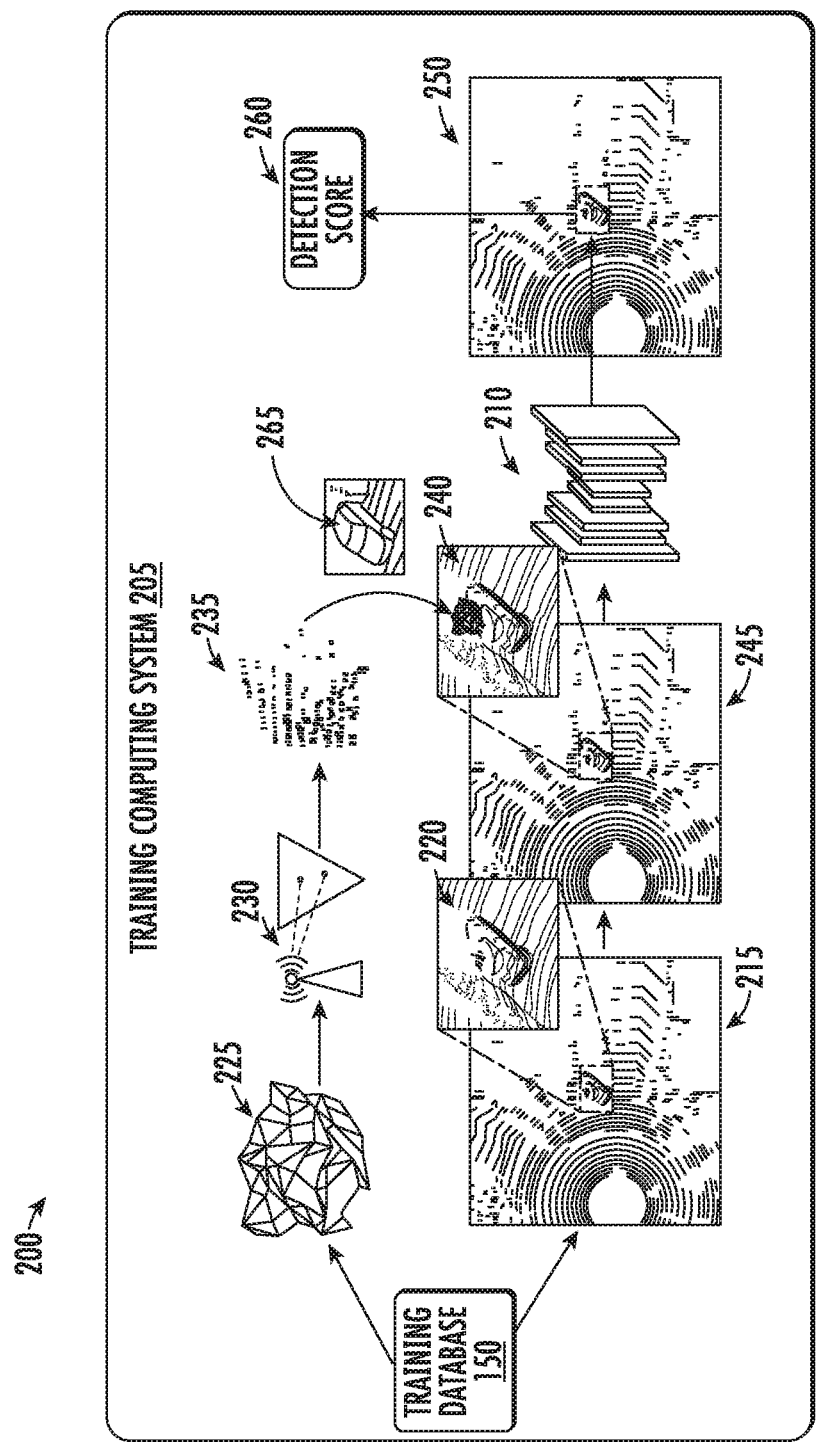
FIG. 2 depicts a data flow diagram for generating a universal adversarial object according to example implementations of the present disclosure.

For example, FIG. 2 depicts a data flow diagram 200 for generating a universal adversarial object to train one or more machine learned models according to example implementations of the present disclosure. A machine-learned object detection model 210 can be trained by a training computing system 205 remote from a vehicle (e.g., vehicle 102 of FIG. 1). The training computing system 205 can include and/or be a component of an operations computing system (e.g., operations computing system 104 of FIG. 1) configured to monitor and communicate with a vehicle (e.g., via network 108 of FIG. 1). In addition, or alternatively, the training computing system 205 can include and/or be a component of one or more remote computing devices (e.g., remote computing device(s) 106 of FIG. 1) such as, for example, one or more remote servers configured to communicate with a vehicle (e.g., via network 108 of FIG. 1).

The training computing system 205 can include and/or have access to a training database 150, such as training database 150 depicted in FIG. 1, and at least one machine-learned object detection model 210. The machine-learned object detection model 210 can be configured to receive a respective training scene (e.g., training scene 215) of the plurality of training scenes from the training database 150. In response to receipt of the respective training scene, the model 210 can output a respective detection output (e.g., detection output 250) indicative of one or more training objects (e.g., a training object within the respective training scene. The machine-learned object detection model 210 can include any machine-learned model (e.g., deep neural networks, convolutional neural networks, recurrent neural networks, recursive neural networks, decision trees, logistic regression models, support vector machines, etc.). In some implementations, the machine-learned object detection model 210 can include one or more deep neural networks such as, for example, the PIXOR detection network (e.g., a detection network that processes input point clouds into occupancy voxels and generates bounding boxes in a bird's eye view), PIXOR (density) network (e.g., a variant of PIXOR using density voxels as inputs the value of each voxel being calculated from bilinear interpolation of nearby points' distance to the voxel center), PointRCNN (e.g., a model that processes raw point cloud data directly using a PointNet++ backbone), PointPillar network (e.g., a model that groups input points into discreate bins from BEV and uses PointNet to extract features from each pillar), etc. The one or more deep neural networks can be trained to maximize a detection score indicative of one or more objects detected in a scene. The training computing system 205 can include a memory that stores the training database 150, the machine-learned object detection model 210, and a set of instructions. In addition, the training computing system 205 can include one or more processors which can be configured to use the set of instructions to train the machine-learned object detection model 210.

To do so, the training computing system 205 can obtain data (e.g., training data 155, scene data 160, adversarial object data 165, etc.) indicative of a first training scene 215 and the adversarial object 225 from the training database 150. For example, the training computing system 205 can obtain data indicative of a training scene 215 including a plurality of three-dimensional scene datapoints representing an environment. In addition, or alternatively, the training computing system 205 can obtain an adversarial object 225 defined by a plurality of three-dimensional adversarial object parameters. In some implementations, the training computing system 205 can apply box constraints to the adversarial object model (e.g., one or more mesh vertices of the adversarial object model) based on the training scene 215 and/or one or more training objects of the training scene 215 to ensure physical feasibility.

The training computing system 205 can identify a target object 220 within the training scene 215. For example, the training computing system 205 can identify the target object 220 based on the one or more training object point clouds of the training scene 215. By way of example, the target object 220 can be represented by a plurality of three-dimensional target object datapoints of the plurality of three-dimensional scene datapoints. The plurality of three-dimensional target object datapoints can include a respective training object point cloud of the plurality of three-dimensional scene datapoints. The training computing system 205 can select the target object 220 (e.g., the plurality of three-dimensional target object datapoints) from the one or more training objects (e.g., one or more training object point clouds) within the training scene 215. For instance, in some implementations, the target object 220 can be randomly selected from the one or more training objects represented by the training scene 215.

The training computing system 205 can generate data indicative of a modified training scene 245 based on the training scene 215, the target object 220, and/or the adversarial object 225. For instance, the training computing system 205 can obtain an adversarial object representation 235 including a plurality of three-dimensional adversarial object datapoints. The modified training scene 245 can include the three-dimensional representation 235 of the adversarial object 225 (e.g., as indicated by the plurality of three-dimensional adversarial object datapoints) relative to the target object 220 within the training scene 215. By way of example, the three-dimensional representation 235 of the adversarial object 225 can include the plurality of three-dimensional adversarial datapoints localized within the training scene 215 relative to the target object 220. The modified training scene 245 can include the three-dimensional representation 235 of the adversarial object 225 on the target object 220 within the training scene 215. For instance, the adversarial object 225 can be located on the roof of a vehicle target object.

Figure 3:
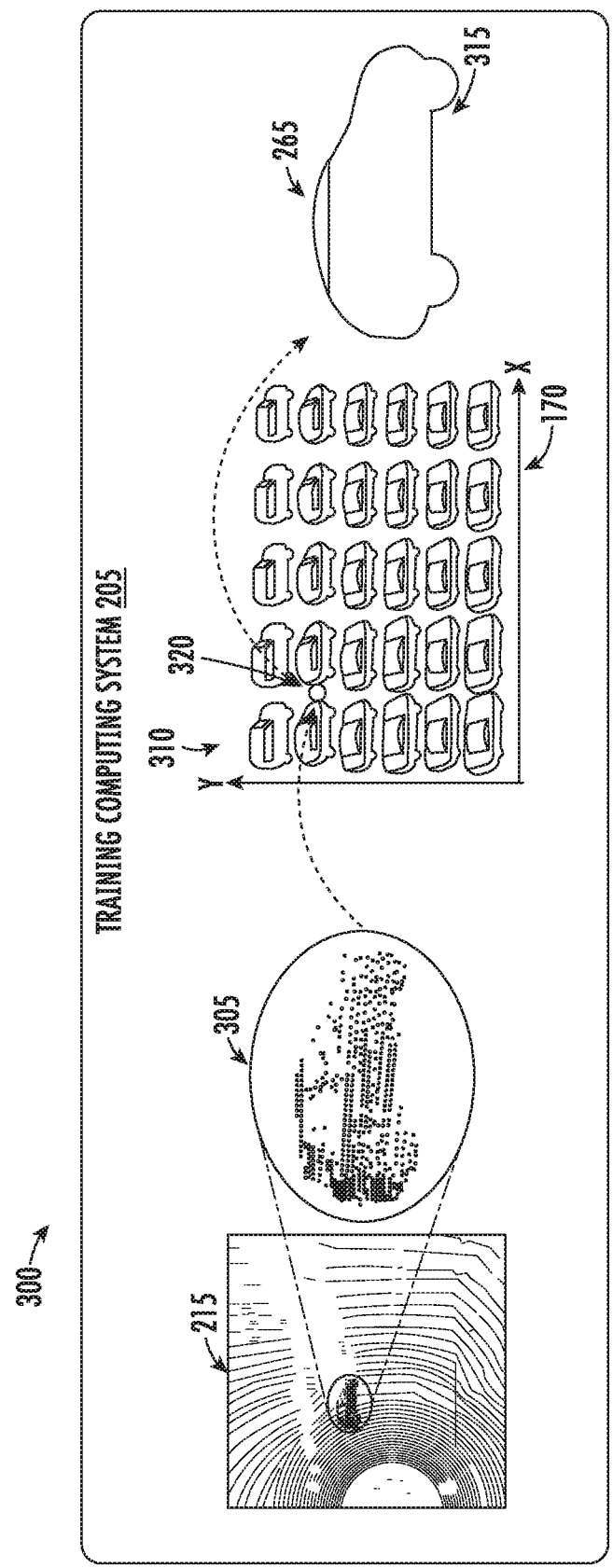
FIG. 3 depicts an example of identifying an adversarial location for an adversarial object according to example implementations of the present disclosure.

The training computing system 205 can determine the adversarial location 240 for the adversarial object 225 within the training scene 215 based on the target object 220. For example, FIG. 3 depicts an example process 300 for identifying an adversarial location for an adversarial object according to example implementations of the present disclosure. The adversarial location 240 for the adversarial object 225, for example, can include a location within the scene 215 relative to the training object (e.g., represented by the three-dimensional target datapoints 305). By way of example, the adversarial location 240 can include a top, side, bottom, etc. portion of the training object as represented by 305. The training computing system 205 can determine the respective portion of the training object by comparing the plurality of three-dimensional target datapoints 305 to the training object data 170 of the training database 150.

For example, the training computing system 205 can obtain a plurality of training object representations 310 from the training database 150 based on the target object 220. For example, the target object 220 can include a vehicle within the training scene 215. In such a case, the training computing system 205 can obtain a plurality of training object representations 310 of a vehicle type. The vehicle training object representations 310 can include various vehicle representations, each defined by a plurality of three-dimensional training object parameters.

The training computing system 205 can generate a target representation 315 defined by a plurality of three-dimensional target representation parameters by comparing the plurality of three-dimensional target object datapoints 305 to the plurality of three-dimensional training object parameters of one or more of the plurality of training object representations 310. For example, the training computing system 205 can fit (e.g., at 320) one or more training object representations 310 to the plurality of three-dimensional target object datapoints 305 (e.g., the point cloud defining the target object 220). For example, the plurality of training object representations 310 can be represented as signed distance functions (SDFs), denoted as $F(\bullet; \theta)$. The training computing system 205 can project the plurality of training object representations 310 into a latent space using principal components analysis ("PCA"). The training computing system 205 can optimize the latent code z such that all ground truth vehicle points evaluate as close to 0 as possible. Given a target object bounding box (x, y, w, h, $\alpha$), and a set of points $P=\{p: p \in \mathbb{R}\}$ within the box, the training computing system 205 can find the optimal latent code z* such that:

$$z^* = \arg\min \Sigma_{p \in P} F(p; \theta(z))^2$$

The training computing system 205 can apply marching cubes on $F(\bullet; \theta(z^*))$ to obtain a fitted target object representation 315. The training computing system 205 can identify the adversarial location 240 for the adversarial object 225 based on the target object representation 315. The training computing system 205 can aim to add the adversarial object 225 to the scene 215 in a realistic manner. For example, in some implementations, the adversarial location 240 can include a roof 265 of the vehicle. By way of example, the training computing system 205 can be configured to identify the roof 265 of the training object 220 by using vertices within the top 0.2 m vertical range of the target representation 315 to approximate the roof region 265. This can be beneficial as the roof of a vehicle is more easily used for storage due to gravity and does not interfere with adjacent traffic in real world settings. Moreover, in virtual settings, objects on top of a vehicle are not prone to occlusion, whereas areas like the front hood or trunk top cannot be seen if there is another vehicle blocking the target vehicle. In addition, realistic scenarios exist, as it is common to strap furniture, canoes, bicycles, and other large items on top of a vehicle.

Turning back to FIG. 2, the training computing system 205 can obtain the adversarial object representation 235 including the plurality of three-dimensional adversarial object datapoints based on the adversarial location 240 and/or one or more adversarial object parameters of the adversarial object 225. For example, the training computing system 205 can obtain an adversarial mesh representation of the adversarial object 225. The adversarial mesh representation can include a plurality of adversarial object parameters that define the adversarial object 225. The training computing system 205 can render (e.g., via renderer 230) the adversarial mesh representation of the adversarial object 225 into the plurality of three-dimensional adversarial object datapoints to obtain the adversarial object representation 235. By way of example, the plurality of three-dimensional adversarial object datapoints can be rendered into three-dimensional LiDAR points. The three-dimensional LiDAR points, for example, can be localized within the training scene 215 at the adversarial location 240.

In some implementations, the training computing system 205 can render (e.g., via renderer 230) the plurality of three-dimensional adversarial object datapoints 235 by inputting the plurality of adversarial object parameters (e.g., as defined by the adversarial mesh representation) and/or the desired adversarial location 240 of the adversarial object 225 within the training scene 215 into a LiDAR renderer 230. The LiDAR renderer 230, for example, can use the adversarial location 240 of the adversarial object 225 within the training scene 215 to sample nearby rays γ with the same angular frequency as the LiDAR sensor used to generate the training scene 215. Given rays γ and the adversarial object parameters Z, the training computing system 205 (e.g., via the LiDAR render 230) can render a plurality of three-dimensional adversarial object datapoints 235 with a differentiable raycaster R. The training computing system 205 can compute the intersection of rays and mesh faces with a Moller-Trumbore intersection algorithm.

The training computing system 205 can generate a union (e.g., a modified training scene 245) of the plurality of three-dimensional scene datapoints (e.g., of the training scene 215) and the plurality of three-dimensional adversarial datapoints 235 (e.g., of the adversarial object 225). For instance, the training computing system 205 can take the union of the plurality of three-dimensional scene datapoints and the plurality of rendered three-dimensional adversarial datapoints 235 to create the modified training scene 245. For example, the adversarial object parameters Z can be placed with a fixed pose relative to the roof 265 center of the target object 220. Given a target object bounding box (x, y, w, h, α), the training computing system 205 can compute the roof center ($r_x$, $r_y$, $r_z$) and apply the transformation matrix:

$$T = \begin{bmatrix} \cos\alpha & -\sin\alpha & 0 & r_x \\ \sin\alpha & \cos\alpha I & 0 & r_y \\ 0 & 0 & 1 & r_z \\ 0 & 0 & 0 & 1 \end{bmatrix}$$

on the adversarial object parameters.

The training computing system 205 can determine a detection score 260 associated with the modified training scene 245. For example, the training computing system 205 can input the data indicative of the modified training scene 245 to a machine-learned object detection model 210. The training computing system 205 can determine the detection score 260 associated with the modified training scene 245 based on the output (e.g., detection output 250) of the machine-learned object detection model 210. For example, the machine-learned object detection model 210 can be configured to detect the one or more training objects within the training scene 215. The training computing system 205 can input the modified training scene 245 to the machine-learned object detection model 210 to obtain a detection output 250 indicative of one or more detected training objects represented by the modified training scene 245 as an output of the machine-learned object detection model 210. The detection score 260 can be indicative of a confidence score of the machine-learned object detection model 210 in detecting the target object 220.

The training computing system 205 can determine that the one or more detected training objects do not include the target object 220. For example, the training computing system 205 can compare the detection output 250 to ground truth data (e.g., ground truth data 175 of FIG. 1) associated with the modified training scene 245 (e.g., the training scene 215 that was modified by the adversarial object 225) to determine whether the one or more detected training objects include the target object 220. In this manner, the training computing system 205 can determine that the machine-learned object detection model 210 did and/or did not detect the target object 220 within the modified training scene 245 based on the output 250 of the machine-learned object detection model 210. In response to determining that the one or more detected training objects do not include the target object 220 (e.g., that the machine-learned model 210 did not detect the target object 220), the training computing system 205 can lower the detection score 260. In addition, or alternatively, the training computing system 205 can raise the detection score 260 in response to determining that the one or more detected training objects include the target object 220.

Figure 4:
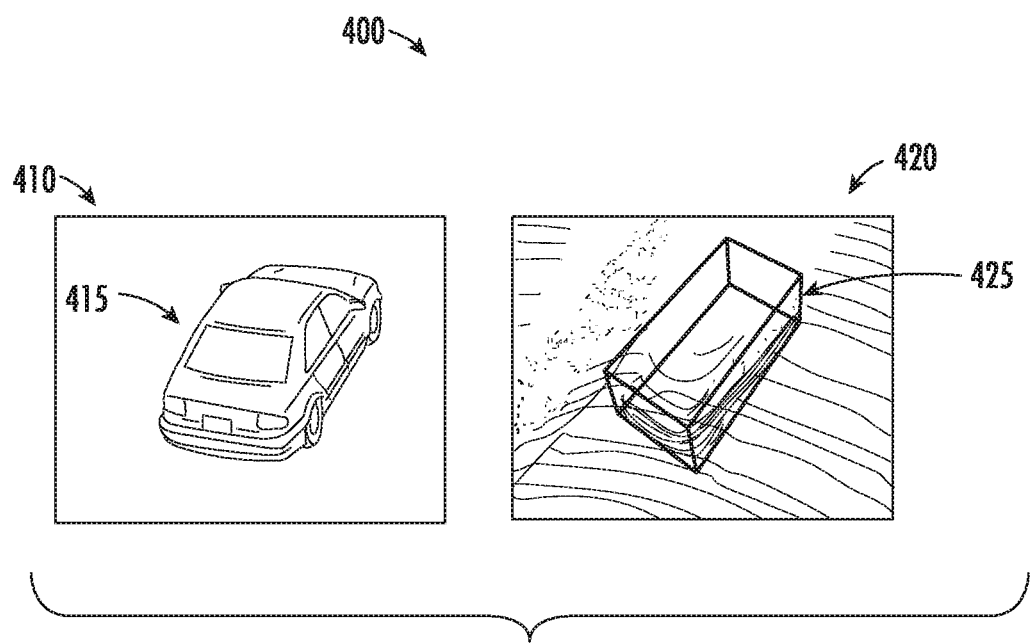
FIG. 4 depicts an unaffected detection process of classifying an example scene without an adversarial object according to example implementations of the present disclosure.
Figure 5:
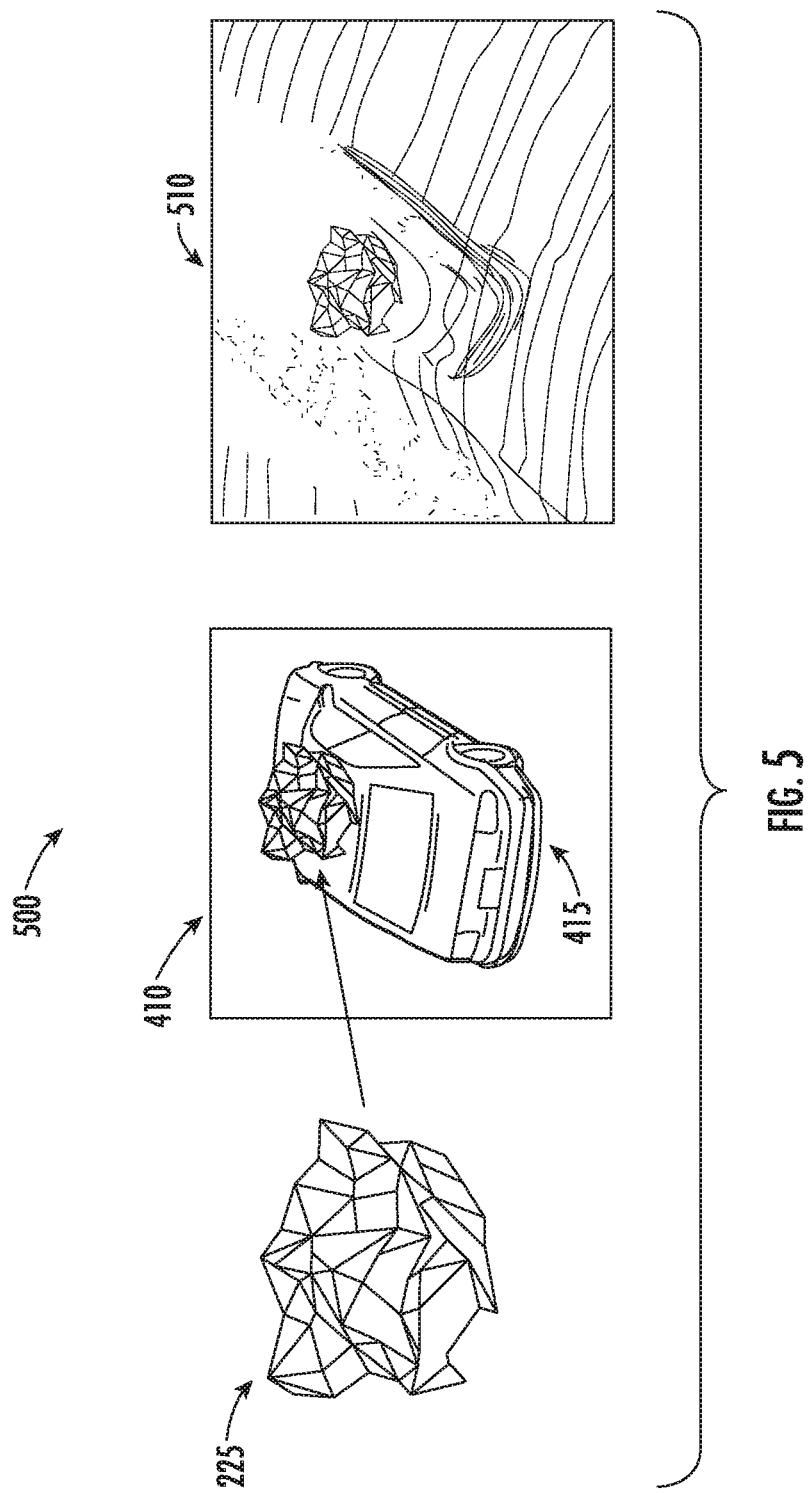
FIG. 5 depicts an affected detection process of classifying an example object within an example scene with an adversarial object according to example implementations of the present disclosure.

The parameters of the adversarial object 220 can be trained to hide the training object 220 from the machine-learned object detection model 210. For example, FIG. 4 depicts an unaffected detection process 400 of classifying an example object within an example scene without an adversarial object according to example implementations of the present disclosure. The example scene 410 can be input to the machine-learned object detection model 210 to receive unaffected detection output 420. The unaffected detection output 420 can include a bounding box 425 indicative of an example training object 415 within the example scene 410. FIG. 5 depicts an affected detection process 500 of classifying an example object within an example scene with an adversarial object according to example implementations of the present disclosure. The example scene 410 can be manipulated (as described herein) to include the adversarial object 225 relative to the example object 415 (e.g., on the roof of the example object 415). The example scene 410 with the adversarial object 225 can be input to the machine-learned object detection model 210 to receive affected detection output 510. The unaffected detection output 510 can fail to include a bounding box indicative of the example training object 415 within the example scene 410.

Turning back to FIG. 2, the training computing system 205 can determine an overall loss based on the detection score 260. The overall loss function can include a combination of an adversarial loss (e.g., based on the detection score 260) and a Laplacian loss for mesh smoothness. The training computing system 205 can update one or more of the plurality of three-dimensional adversarial object parameters associated with the adversarial object 225 based, at least in part, on the detection score 260. For example, one or more of the plurality of three-dimensional adversarial object parameters can be updated to minimize the detection score 260 (and/or minimize the overall loss function). As an example, the training computing system 205 can generate an updated adversarial object (e.g., by updating the adversarial object parameters) by searching for a vertex perturbation v and global transformation parameters (R, t) that minimize the overall loss function.

By way of example, the training computing system 205 can suppress all relevant bounding box proposals. A proposal can be relevant if 1) its confidence score is greater than 0.1 and 2) if its IoU with the groundtruth bounding box is also greater than 0.1. The training computing system 205 can minimize the confidence of the relevant candidates:

$$\mathcal{L}_{adv} = \sum_{y,s \in Y} -IoU(y^*, y)\log(1-s),$$

where Y is the set of relevant bounding box proposals and each proposal y has a confidence score s. The training computing system 205 can use binary cross entropy to minimize the confidence score of the relevant proposals, weighted by the IoU with the ground truth bounding boxy*.

In addition, the Laplacian loss can be applied to regularize the mesh geometry and maintain surface smoothness of the adversarial object 225:

$$L_{lap} = \Sigma_i \|\delta_i\|_2^2,$$

where $\delta_i$ is the distance from $v_i$ to the centroid of its immediate neighbors N(i):

$$\delta_i = v_i - \frac{1}{\|N(i)\|} \sum_{j \in N(i)} v_j.$$

In some implementations, during learning of the adversarial object 225 parameters, the training computing system 205 can deform an adversarial object template by adding local learnable displacement vectors $\Delta v_i \in \mathbb{R}^3$ for each vertex and a global transformation for the entire adversarial object 225:

$$v_i = R(v_i^0 + \Delta v_i) + t,$$

where $v_i^0$ is the initial vertex position, and $R \in SO(3)$ is a global rotation matrix, and $t \in \mathbb{R}^3$ is a global translation vector. To ensure physical feasibility, box constraints can be applied to the adversarial object model parameters (e.g., mesh vertices of the adversarial mesh) as well as the global translation.

In some implementations, for example, where the adversarial object 225 is initialized as an isotropic sphere, R can be fixed to be an identity matrix, since the sphere is rotation invariant. In addition, or alternatively, in some implementations, for example, where the adversarial object 225 is initialized as a common object (e.g., couch, chair, canoe, etc.), the training computing system 205 can deform the adversarial object model by constraining R to be rotation on the x-y plane:

$$R = \begin{matrix} \cos\theta & -\sin\theta & 0 \\ \sin\theta & \cos\theta & 0 \\ 0 & 0 & 1 \end{matrix}$$

where θ is the learnable rotation angle.

Figure 6:
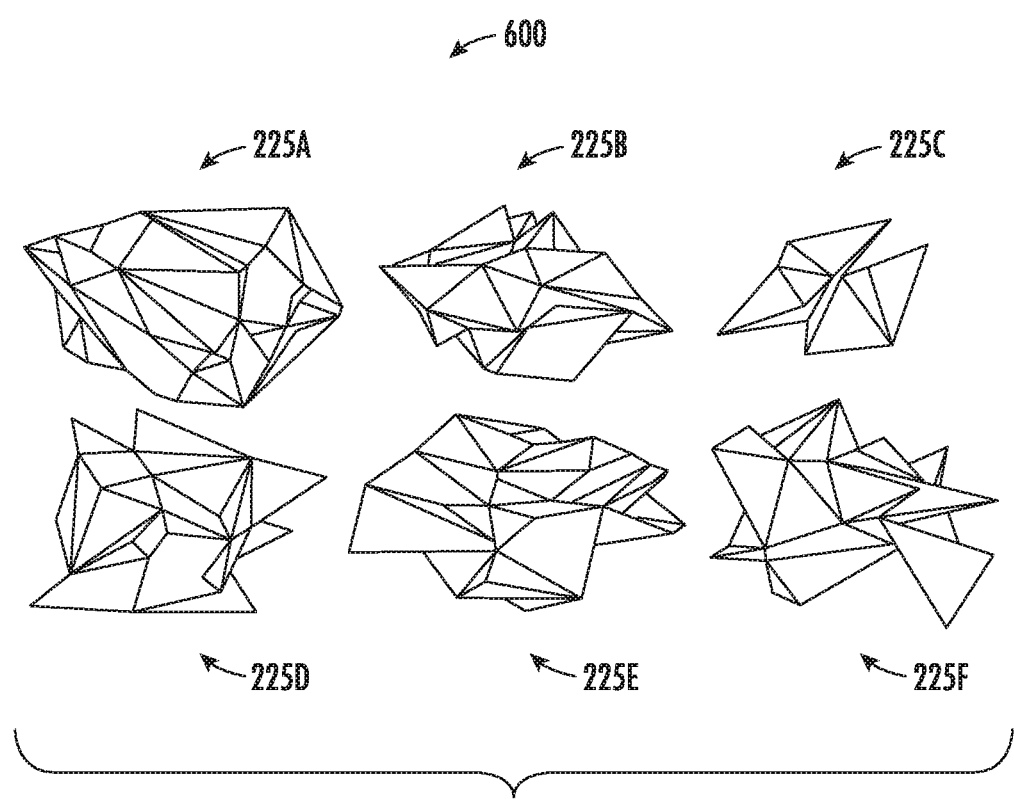
FIG. 6 depicts a plurality of example adversarial objects according to example implementations of the present disclosure.

In this manner, the adversarial object 225 can be formed in a plurality of different shapes. For example, FIG. 6 depicts a plurality of example adversarial objects according to example implementations of the present disclosure. Each adversarial object 225a-f can be defined by a plurality of different adversarial object model parameters. Each set of adversarial object parameters can form a unique polygon 225a-f trained to prevent a machine-learned object detection model from detecting a training object.

Figure 7:
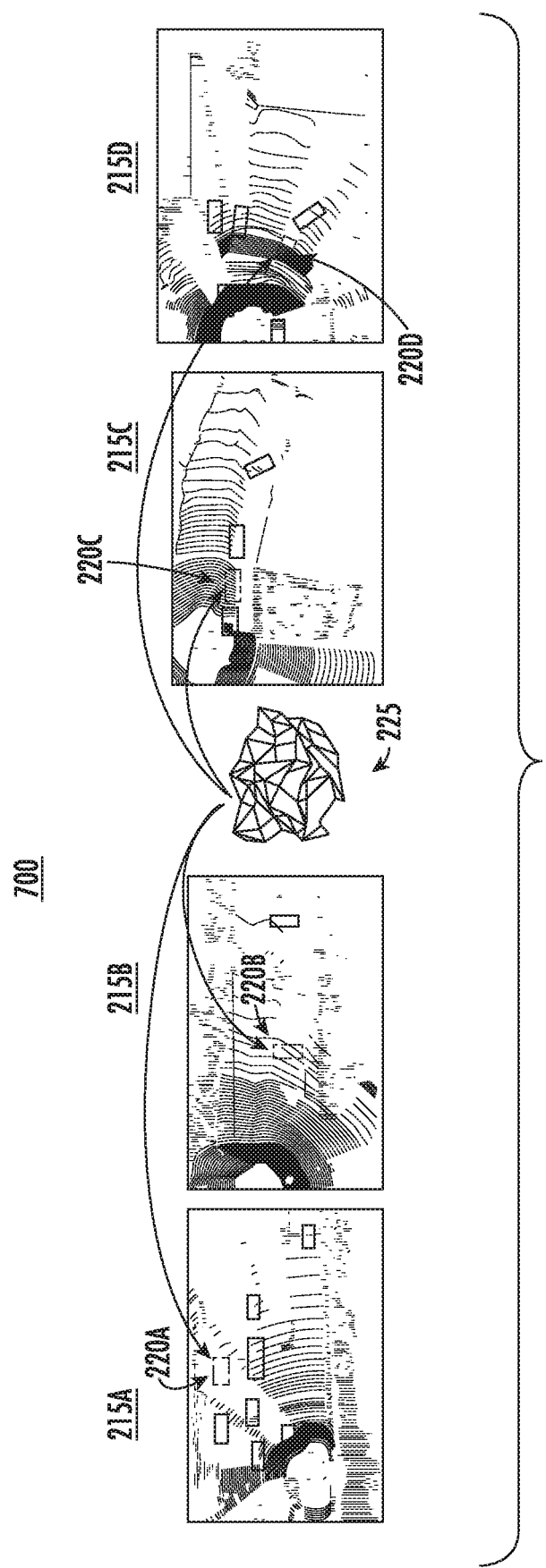
FIG. 7 depicts one adversarial object utilized in a plurality of different training scenes according to example implementations of the present disclosure.

With reference to FIG. 7, the adversarial object 225 can be learned over a plurality of training scenes 215a-d and a plurality of training objects 220a-d. For example, the adversarial object 225 can be learned in a white box setting and/or a black box setting. For example, in a white box setting, the training computing system 205 can simulate the addition of the adversarial object 225 in a differentiable manner. For instance, the training computing system 205 can take the gradient from the adversarial object 225 (e.g., defined as $\mathcal{L}$) to the adversarial object parameters (e.g., mesh vertices of the adversarial mesh). In addition, the training computing system 205 can reparameterize local and global displacement vectors to apply box constraints. For example, the training computing system 205 can reparameterize adversarial object parameters (e.g., mesh vertices) to inherently obey box constraints:

$$v_i = R(b \odot \text{sign}(\tilde{v}_i^0) \odot \sigma(|\tilde{v}_i^0| + \Delta \tilde{v}_i)) + c \odot \tanh(\tilde{t}),$$

where ⊙ denotes element-wise multiplication, σ denotes the sigmoid function, $b \in \mathbb{R}^3$ define limits on size, and $c \in \mathbb{R}^3$ define limits on translation.

$$\sigma\left(\tilde{v}_i^0 = \frac{v_i^0}{b}\right)$$

is the normalized initial position of the vertex and $\tanh(\tilde{t}) = t/c$ is the normalized global translation. The sign function constrains each vertex to stay in the same quadrant where it is initialized.

In addition, or alternatively, the adversarial object 225 can be learned in a black box setting. In a black box setting, the training computing system 205 can employ a genetic algorithm to update the adversarial object parameters (e.g., mesh parameters) and use the inverse of the gradient from the adversarial object $-\mathcal{L}$ as the fitness score. The training computing system 205 can jointly optimize the adversarial parameters of the adversarial object 225 over a plurality of the training scenes 215a-d (e.g., training scene from the training database 150). To do so, the training computing system 205 can average queries over multiple training scenes 215A-D to compute the fitness score at every step. In such a case, the training computing system 205 can avoid reparameterization in gradient-free optimization.

In this manner, the training computing system 205 can create a universal adversarial object 225. The universal adversarial object 225 can be scene independent and thus can be used across a plurality of different training scenes 215A-D. For example, the universal adversarial object 225 can be used to hide different training objects 220A-D at various orientations and locations within various training scenes 215A-D of the training database 150. For instance, a first 215A, second 215A, third 124C, fourth 215D, etc. training scene can be obtained from the training computing system 205. The universal adversarial object 225 can be used in any of the first 215A, second 215B, third 124C, fourth 215D, etc. training scenes to train a machine-learned object detection model 210.

The training computing system 205 can train the object detection machine-learned model 210 based on the detection score 260. The machine-learned object detection model 210, for example, can be trained to maximize the detection score 260 (and/or minimize the overall loss). To do so, the training computing system 205 can use random data augmentation as a defense mechanism. For example, the training computing system 205 can randomly augment a plurality of training scenes 215A-D (e.g., by generating various modified training scenes as described herein) to be input into the machine-learned object detection model 210. During training, the training computing system 205 can generate a random watertight mesh and place it on a random training object (e.g., 220A-D) within a training scene (e.g., using the rooftop fitting methods described herein). To generate the random watertight mesh, the training computing system 205 can sample a set of N vertices $V \in \mathbb{R}^{N \times 3}$ from a Gaussian $N(0,\sigma)$ and apply incremental triangulation to obtain a set of connected tetrahedrons Q. The training computing system 205 can stochastically remove M boundary tetrahedrons that do not disconnect Q into separate components. The remaining boundary faces of Q can be used to obtain the watertight surface. The watertight surface can be used to augment training scenes 215A-D in the manner described herein. The training computing system 205 can update one or more model parameters of the machine-learned object detection model 210 based on the defense mechanism. For instance, the training computing system 205 can update the one or more model parameters of the machine-learned object detection model 210 based at least in part on the detection score 260.

Figure 8:
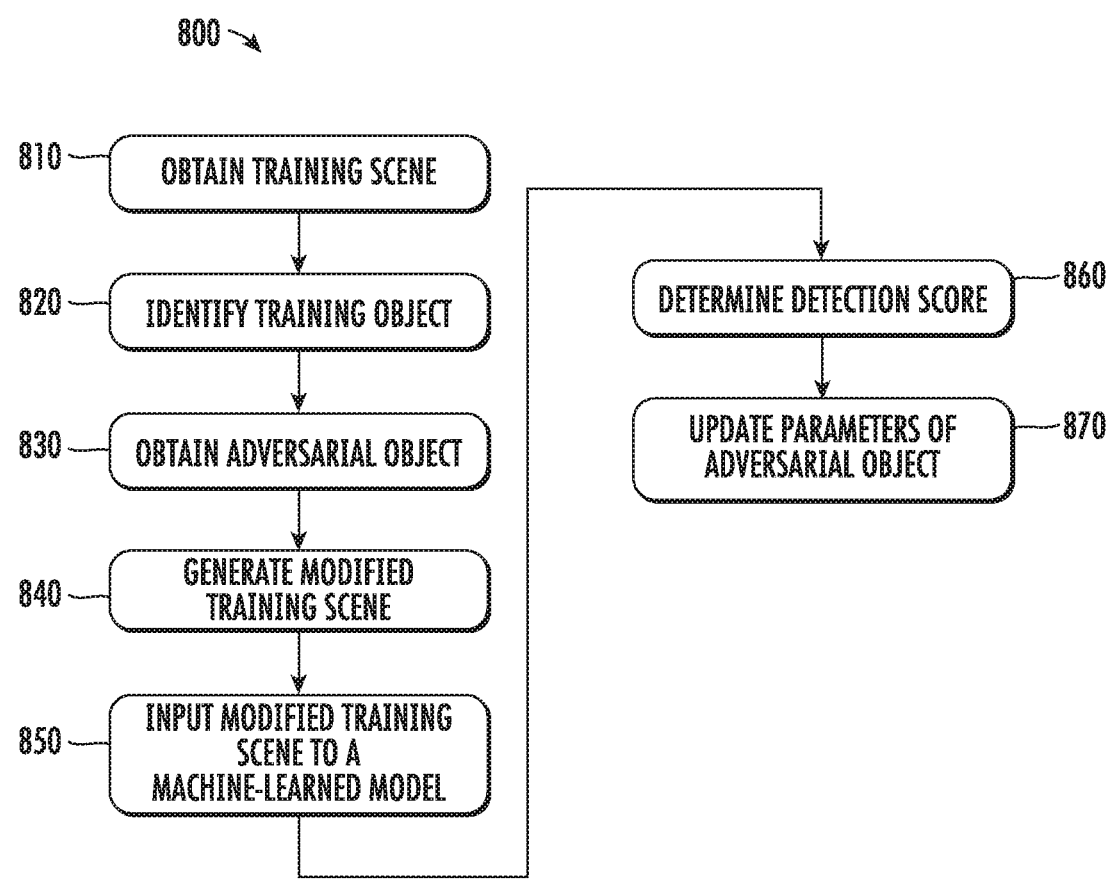
FIG. 8 depicts a flowchart of a method for training an adversarial object according to aspects of the present disclosure.

FIG. 8 depicts a flowchart of a method 800 for training an adversarial object according to aspects of the present disclosure. One or more portion(s) of the method 800 can be implemented by a computing system that includes one or more computing devices such as, for example, the computing systems described with reference to the other figures (e.g., training computing system 200, operations computing system(s) 104, remote computing device(s) 106, etc.). Each respective portion of the method 800 can be performed by any (or any combination) of one or more computing devices. Moreover, one or more portion(s) of the method 800 can be implemented as an algorithm on the hardware components of the device(s) described herein (e.g., as in FIGS. 1, 10, 11, etc.), for example, to train an adversarial object. FIG. 8 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 8 is described with reference to elements/terms described with respect to other systems and figures for exemplary illustrated purposes and is not meant to be limiting. One or more portions of method 800 can be performed additionally, or alternatively, by other systems.

At 810, the method 800 can include obtaining a training scene. For example, a computing system (e.g., computing system 200, etc.) can obtain a training scene. For instance, the computing system can obtain data indicative of a training scene including a plurality of three-dimensional scene datapoints representing an environment. By way of example, the computing system can include a training database including scene data and data indicative of an adversarial object. The scene data can include a plurality of training scenes. Each training scene can include a plurality of three-dimensional datapoints representing an environment.

At 820, the method 800 can include identifying a training object. For example, a computing system (e.g., computing system 200, etc.) can identify a training object. For instance, the computing system can identify a target object within the training scene. The target object, for example, can be represented by a plurality of three-dimensional target object datapoints. The target object can include a vehicle within the training scene. In some implementations, the computing system can select the target object from one or more training objects within the training scene. For instance, the target object can be randomly selected from the one or more training objects within the scene.

At 830, the method 800 can include obtaining an adversarial object. For example, a computing system (e.g., computing system 200, etc.) can obtain an adversarial object. For instance, the computing system can obtain an adversarial object representation including a plurality of three-dimensional adversarial object datapoints. The computing system can obtain a mesh representation of the adversarial object. In some implementations, the computing system can render the mesh representation of the adversarial object into the plurality of three-dimensional adversarial object datapoints. The three-dimensional adversarial object datapoints can be rendered three-dimensional LIDAR points.

At 840, the method 800 can include generating a modified training scene. For example, a computing system (e.g., computing system 200, etc.) can generate a modified training scene. For instance, the computing system can generate data indicative of a modified training scene based, at least in part, on the training scene, the target object, and/or the adversarial object. The modified training scene, for example, can include a three-dimensional representation of the adversarial object on the target object. By way of example, the three-dimensional representation of the adversarial object can include the plurality of three-dimensional adversarial object datapoints localized within the training scene.

The computing system can generate a union of at least a subset of the plurality of three-dimensional scene datapoints and at least a subset of the plurality of three-dimensional adversarial object datapoints to generate the modified training scene. To do so, the computing system can determine an adversarial location for the adversarial object within the training scene based, at least in part, on the target object. For instance, the computing system can obtain a plurality of training object representations. Each training object representation can be defined by a plurality of three-dimensional training object parameters. The computing system can generate a target object representation defined by a plurality of three-dimensional target representation parameters by comparing the plurality of three-dimensional target object datapoints to the plurality of three-dimensional training object parameters of one or more of the training object representations. The computing system can identify the adversarial location for the adversarial object based, at least in part, on the target object representation. The computing system can generate the three-dimensional representation of the adversarial object based, at least in part, on the adversarial location. For example, in some implementations, the adversarial location can include the roof of the vehicle and the adversarial object can be located on the roof of the vehicle.

At 850, the method 800 can include inputting the modified training scene to a machine-learned model. For example, a computing system (e.g., computing system 200, etc.) can input the modified training scene to the machine-learned model. For instance, the computing system can input the data indicative of the modified training scene to a machine-learned object detection model. The machine-learned object detection model, for example, can be configured to detect the one or more training objects within the training scene. For instance, the computing system can include a machine-learned object detection model configured to receive a respective training scene of the plurality of training scenes, and in response to receipt of the respective training scene, output a respective detection output indicative of one or more training objects within the respective training scene. By way of example, the machine-learned object detection model can include one or more deep neural networks.

At 860, the method 800 can include determining a detection score. For example, a computing system (e.g., computing system 200, etc.) can determine a detection score. For instance, the computing system can determine a detection score associated with the modified scene based, at least in part, on an output of the machine-learned object detection model. The detection score can be indicative of a confidence score of the machine-learned object detection model in detecting the target object. The computing system can determine that the machine-learned object detection model did not detect the target object within the modified training scene based at least in part on the output of the machine-learned object detection model. In some implementations, the computing system can lower the detection score in response to determining that the machine-learned object detection model did not detect the target object.

Figure 9:
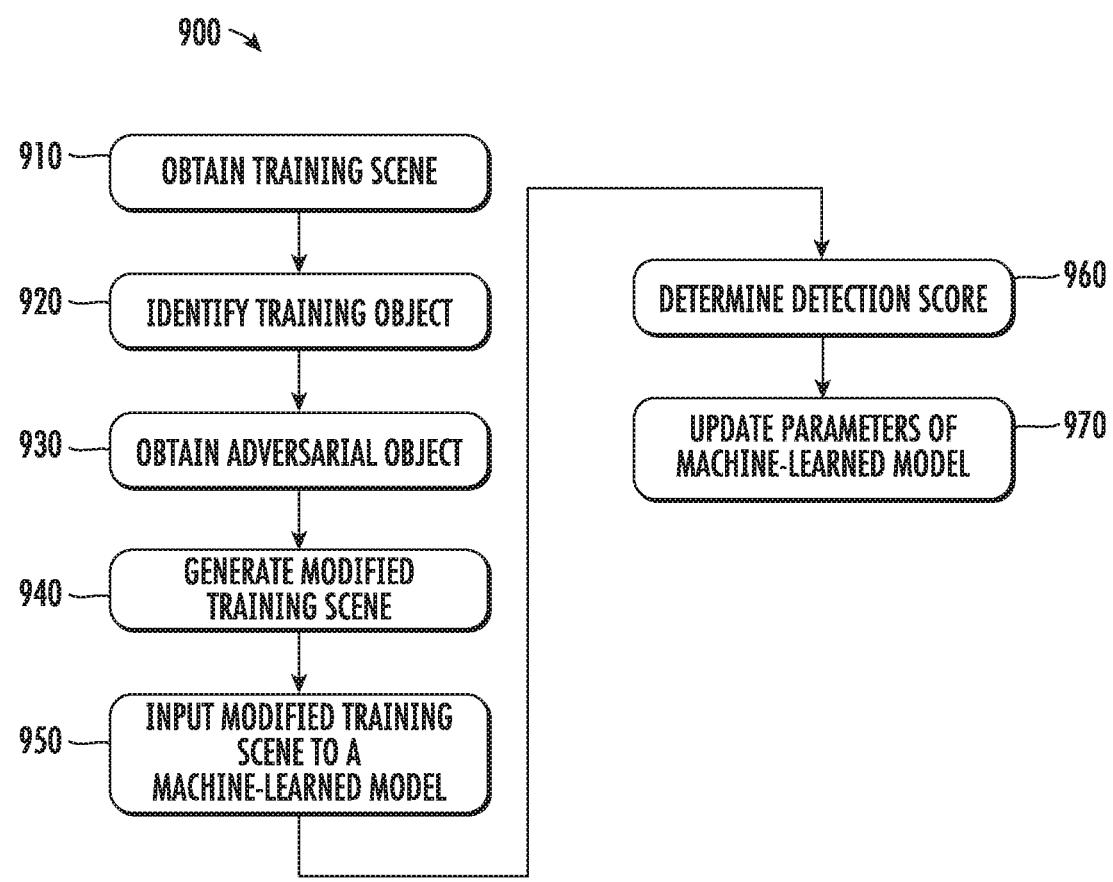
FIG. 9 is another flowchart of a method for training a machine-learned model according to aspects of the present disclosure.

At 870, the method 800 can include updating parameters of the adversarial object. For example, a computing system (e.g., computing system 200, etc.) can update the parameters of the adversarial object. For instance, the computing system can update one or more three-dimensional adversarial object parameters associated with the adversarial object based, at least in part, on the detection score. The one or more three-dimensional adversarial object parameters, for example, can be updated to minimize the detection score FIG. 9 is another flowchart of a method 900 for training a machine-learned model according to aspects of the present disclosure. One or more portion(s) of the method 900 can be implemented by a computing system that includes one or more computing devices such as, for example, the computing systems described with reference to the other figures (e.g., computing system 200, operations computing system(s) 104, remote computing device(s) 106, etc.). Each respective portion of the method 900 can be performed by any (or any combination) of one or more computing devices. Moreover, one or more portion(s) of the method 900 can be implemented as an algorithm on the hardware components of the device(s) described herein (e.g., as in FIGS. 1, 10, 11 etc.), for example, to train a machine-learned model. FIG. 9 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 9 is described with reference to elements/terms described with respect to other systems and figures for exemplary illustrated purposes and is not meant to be limiting. One or more portions of method 900 can be performed additionally, or alternatively, by other systems.

At 910, the method 900 can include obtaining a training scene. For example, a computing system (e.g., computing system 200, etc.) can obtain a training scene. At 920, the method 900 can include identifying a training object. For example, a computing system (e.g., computing system 200, etc.) can identify a training object. At 930, the method 900 can include obtaining an adversarial object. For example, a computing system (e.g., computing system 200, etc.) can obtain an adversarial object. At 940, the method 900 can include generating a modified training scene. For example, a computing system (e.g., computing system 200, etc.) can generate a modified training scene. At 950, the method 900 can include inputting the modified training scene to a machine-learned model. For example, a computing system (e.g., computing system 200, etc.) can input the modified training scene to the machine-learned model. At 960, the method 900 can include determining a detection score. For example, a computing system (e.g., computing system 200, etc.) can determine a detection score.

At 970, the method 900 can include updating parameters of the machine-learned model. For example, a computing system (e.g., computing system 200, etc.) can update the parameters of the machine-learned model. For instance, the computing system can update one or more model parameters of the machine-learned object detection model based at least in part on the detection score. For instance, the machine-learned object detection model can include one or more deep neural networks trained to maximize the detection score.

Figure 10:
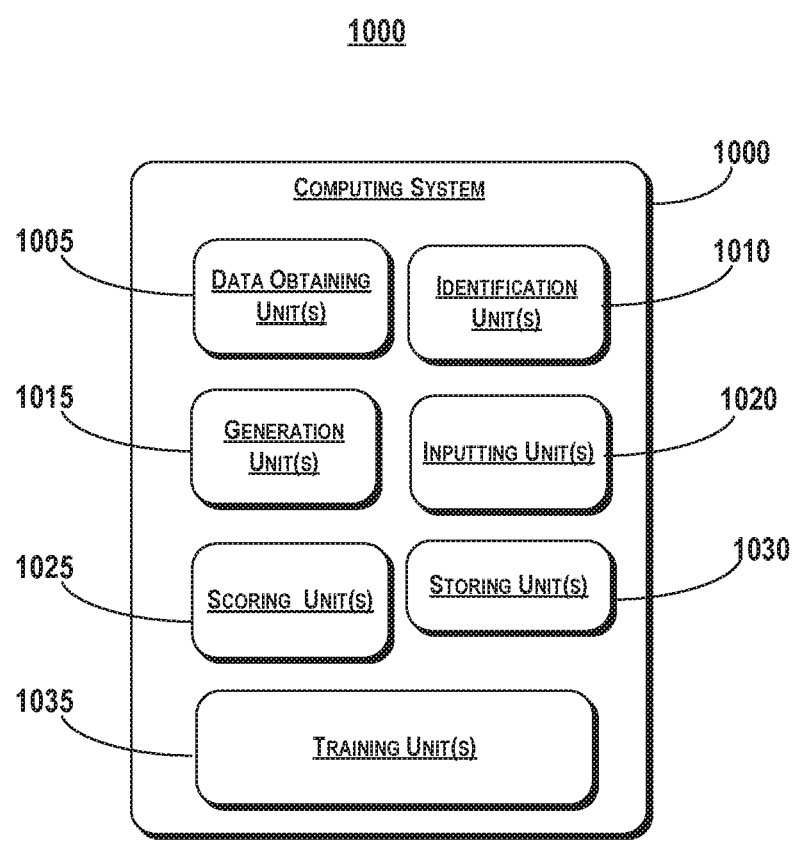
FIG. 10 depicts an example system with various means for performing operations and functions according example implementations of the present disclosure.

FIG. 10 depicts example computing system 1000 with various means for performing operations and functions according example implementations of the present disclosure. One or more operations and/or functions in FIG. 10 can be implemented and/or performed by one or more devices (e.g., one or more remote computing devices 106) or systems including, for example, the operations computing system 104, the vehicle 108, or the vehicle computing system 112, which are shown in FIG. 1. Further, the one or more devices and/or systems in FIG. 10 can include one or more features of one or more devices such as remote computing devices 106 and/or systems including, for example, the operations computing system 104, the vehicle 108, or the vehicle computing system 112, which are depicted in FIG. 1.

Various means can be configured to perform the methods and processes described herein. For example, a computing system can include data obtaining unit(s) 1005, identification unit(s) 1010, generation unit(s) 1015, inputting unit(s) 1020, scoring unit(s) 1025, storing unit(s) 1030, training unit(s) 1035, and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry, for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means (e.g., data obtaining unit(s) 1005, etc.) can be configured to obtain data, for example, such as data indicative of a training scene. The data can include, for example, a plurality of three-dimensional scene datapoints representing an environment. In addition, or alternatively, the means (e.g., data obtaining unit(s) 1005, etc.) can be configured to obtain an adversarial object representation including a plurality of three-dimensional adversarial object datapoints.

The means (e.g., identification unit(s) 1010, etc.) can be configured to identify a target object within the training scene. The target object can be represented by a plurality of three-dimensional target object datapoints. The means (e.g., identification unit(s) 1015, etc.) can be configured to generate data indicative of a modified training scene based, at least in part, on the training scene, the target object, and/or the adversarial object. The modified training scene can include a three-dimensional representation of the adversarial object on the target object.

The means (e.g., inputting unit(s) 1020, etc.) can be configured to input the data indicative of the modified training scene to a machine-learned object detection model. The means (e.g., scoring unit(s) 1025, etc.) can be configured to determine a detection score associated with the modified scene based, at least in part, on an output of the machine-learned object detection model. The means (e.g., training unit(s) 1035, etc.) can be configured train the machine-learned object detection model and/or the adversarial object based on the detection score. For example, the means (e.g., training unit(s) 1035, etc.) can be configured to update one or more model parameters of the machine-learned object detection model based at least in part on the detection score. In addition, or alternatively, the means (e.g., training unit(s) 1035, etc.) can be configured to update one or more three-dimensional adversarial object parameters associated with the adversarial object based, at least in part, on the detection score. The one or more three-dimensional adversarial object parameters can be updated to minimize the detection score. The means (e.g., storing unit(s) 1030, etc.) can be configured to store the one or more updated parameters in a training database. Additionally, or alternatively, the means can be configured to perform any of the other operations/functions described (e.g., with regard to FIGS. 8-9) and/or claimed herein.

Figure 11:
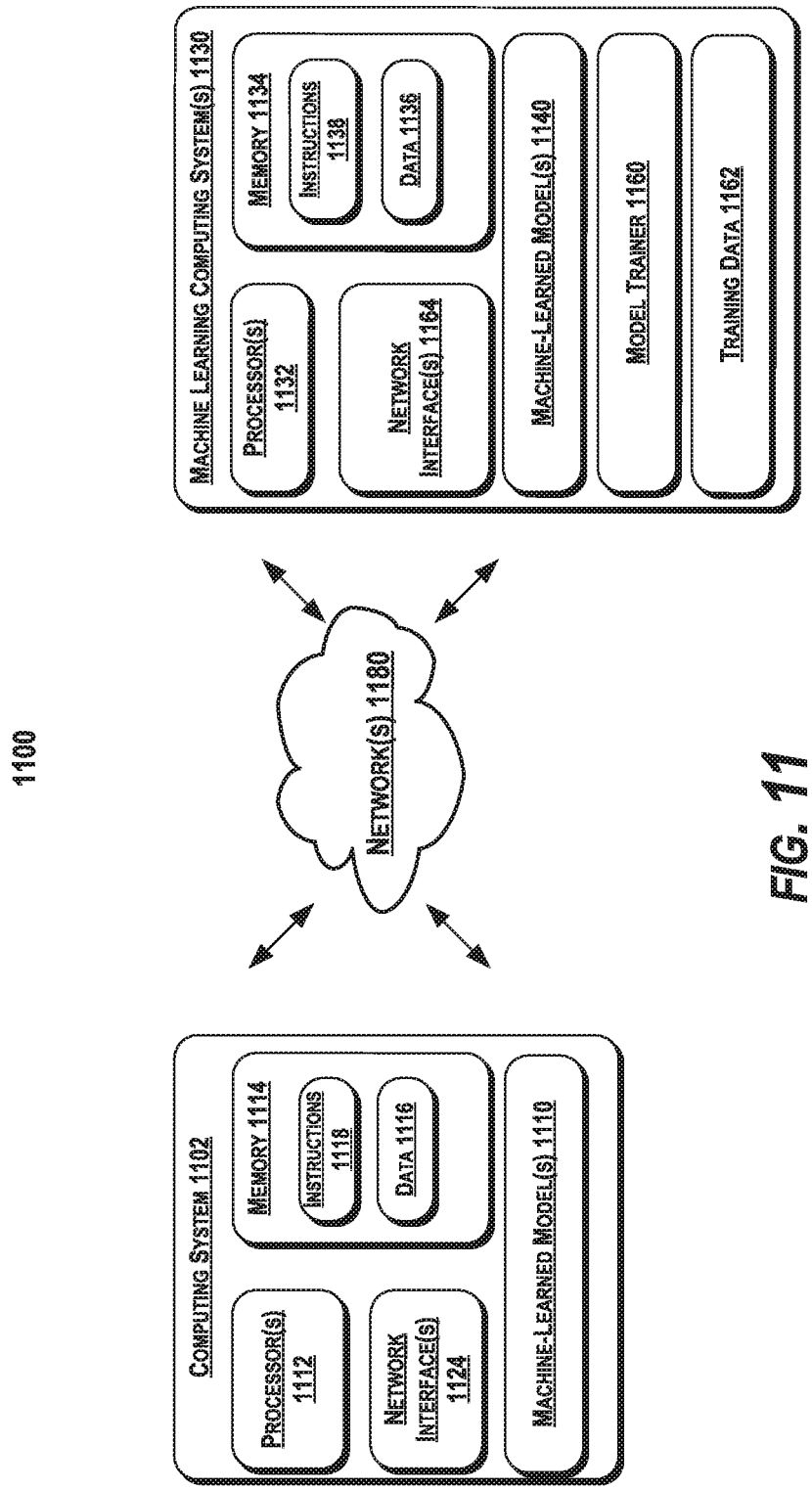
FIG. 11 depicts a block diagram of an example computing system according to example embodiments of the present disclosure.

FIG. 11 depicts a block diagram of an example computing system 1100 according to example embodiments of the present disclosure. The example system 1100 includes a computing system 1102 and a machine learning computing system 1130 that are communicatively coupled over a network 1180.

In some implementations, the computing system 1102 can perform one or more functions or operations to train object detection machine-learned models using adversarial examples. In some implementations, the computing system 1102 can be included in an autonomous vehicle. For example, the computing system 1102 can be on-board the autonomous vehicle. In other implementations, the computing system 1102 is not located on-board the autonomous vehicle. For example, the computing system 1102 can operate offline to train object detection machine-learned models using adversarial examples. The computing system 1102 can include one or more distinct physical computing devices.

The computing system 1102 includes one or more processors 1112 and a memory 1114. The one or more processors 1112 can be any suitable processing device (e.g., a processor core, a microprocessor, an ASIC, a FPGA, a controller, a microcontroller, etc.) and can be one processor or a plurality of processors that are operatively connected. The memory 1114 can include one or more non-transitory computer-readable storage media, such as RAM, ROM, EEPROM, EPROM, one or more memory devices, flash memory devices, etc., and combinations thereof.

The memory 1114 can store information that can be accessed by the one or more processors 1112. For instance, the memory 1114 (e.g., one or more non-transitory computer-readable storage mediums, memory devices) can store data 1116 that can be obtained, received, accessed, written, manipulated, created, and/or stored. The data 1116 can include, for instance, training data, scene data, adversarial object data, training object data, ground truth data, and/or any other data described herein. In some implementations, the computing system 1102 can obtain data from one or more memory device(s) that are remote from the system 1102.

The memory 1114 can also store computer-readable instructions 1118 that can be executed by the one or more processors 1112. The instructions 1118 can be software written in any suitable programming language or can be implemented in hardware. Additionally, or alternatively, the instructions 1118 can be executed in logically and/or virtually separate threads on processor(s) 1112.

For example, the memory 1114 can store instructions 1118 that when executed by the one or more processors 1112 cause the one or more processors 1112 to perform any of the operations and/or functions described herein, including, for example, obtaining data indicative of a training scene, identifying a target object within the training scene, obtaining an adversarial object, generating data indicative of a modified training scene, determining a detection score, training the machine-learned object detection model based on the detection score, and/or or any other operations or functions for training object detection model using adversarial examples.

According to an aspect of the present disclosure, the computing system 1102 can store or include one or more machine-learned models 1110. As examples, the machine-learned models 1110 can be or can otherwise include various machine-learned models such as, for example, neural networks (e.g., deep neural networks), support vector machines, decision trees, ensemble models, k-nearest neighbors models, Bayesian networks, or other types of models including linear models and/or non-linear models. Example neural networks include feed-forward neural networks, recurrent neural networks (e.g., long short-term memory recurrent neural networks), convolutional neural networks, or other forms of neural networks.

In some implementations, the computing system 1102 can receive the one or more machine-learned models 1110 from the machine learning computing system 1130 over network 1180 and can store the one or more machine-learned models 1110 in the memory 1114. The computing system 1102 can then use or otherwise implement the one or more machine-learned models 1110 (e.g., by processor(s) 1112). In particular, the computing system 1102 can implement the machine learned model(s) 1110 to generate a modified training scene, determine a detection score, update an adversarial object, etc.

The machine learning computing system 1130 includes one or more processors 1132 and a memory 1134. The one or more processors 1132 can be any suitable processing device (e.g., a processor core, a microprocessor, an ASIC, a FPGA, a controller, a microcontroller, etc.) and can be one processor or a plurality of processors that are operatively connected. The memory 1134 can include one or more non-transitory computer-readable storage media, such as RAM, ROM, EEPROM, EPROM, one or more memory devices, flash memory devices, etc., and combinations thereof.

The memory 1134 can store information that can be accessed by the one or more processors 1132. For instance, the memory 1134 (e.g., one or more non-transitory computer-readable storage mediums, memory devices) can store data 1136 that can be obtained, received, accessed, written, manipulated, created, and/or stored. The data 1136 can include, for instance, training data, scene data, adversarial object data, training object data, ground truth data, and/or any other data described herein. In some implementations, the machine learning computing system 1130 can obtain data from one or more memory device(s) that are remote from the system 1130.

The memory 1134 can also store computer-readable instructions 1138 that can be executed by the one or more processors 1132. The instructions 1138 can be software written in any suitable programming language or can be implemented in hardware. Additionally, or alternatively, the instructions 1138 can be executed in logically and/or virtually separate threads on processor(s) 1132.

For example, the memory 1134 can store instructions 1138 that when executed by the one or more processors 1132 cause the one or more processors 1132 to perform any of the operations and/or functions described herein, including, for example, obtaining data indicative of a training scene, identifying a target object within the training scene, obtaining an adversarial object, generating data indicative of a modified training scene, determining a detection score, training the machine-learned object detection model based on the detection score, and/or or any other operations or functions for training object detection model using adversarial examples.

In some implementations, the machine learning computing system 1130 includes one or more server computing devices. If the machine learning computing system 1130 includes multiple server computing devices, such server computing devices can operate according to various computing architectures, including, for example, sequential computing architectures, parallel computing architectures, or some combination thereof.

In addition, or alternatively to the model(s) 1110 at the computing system 1102, the machine learning computing system 1130 can include one or more machine-learned models 1140. As examples, the machine-learned models 1140 can be or can otherwise include various machine-learned models such as, for example, neural networks (e.g., deep neural networks), support vector machines, decision trees, ensemble models, k-nearest neighbors models, Bayesian networks, or other types of models including linear models and/or non-linear models. Example neural networks include feed-forward neural networks, recurrent neural networks (e.g., long short-term memory recurrent neural networks), convolutional neural networks, or other forms of neural networks.

As an example, the machine learning computing system 1130 can communicate with the computing system 1102 according to a client-server relationship. For example, the machine learning computing system 1140 can implement the machine-learned models 1140 to provide a web service to the computing system 102. For example, the web service can provide data indicative of a training scene, a target object within the training scene, an adversarial object, a modified training scene, a detection score, etc.

Thus, machine-learned models 1110 can located and used at the computing system 1102 and/or machine-learned models 1140 can be located and used at the machine learning computing system 1130.

In some implementations, the machine learning computing system 1130 and/or the computing system 1102 can train the machine-learned models 1110 and/or 1140 through use of a model trainer 1160. The model trainer 1160 can train the machine-learned models 1110 and/or 1140 using one or more training or learning algorithms. One example training technique is backwards propagation of errors. In some implementations, the model trainer 1160 can perform supervised training techniques using a set of labeled training data. In other implementations, the model trainer 1160 can perform unsupervised training techniques using a set of unlabeled training data. The model trainer 1160 can perform a number of generalization techniques to improve the generalization capability of the models being trained. Generalization techniques include weight decays, dropouts, or other techniques.

In particular, the model trainer 1160 can train a machine-learned model 1110 and/or 1140 based on a set of training data 1162. The training data 1162 can include, for example, scene data, adversarial object data, training object data, ground truth data, etc. The model trainer 1160 can be implemented in hardware, firmware, and/or software controlling one or more processors.

The computing system 1102 can also include a network interface 1124 used to communicate with one or more systems or devices, including systems or devices that are remotely located from the computing system 1102. The network interface 1124 can include any circuits, components, software, etc. for communicating with one or more networks (e.g., 1180). In some implementations, the network interface 1124 can include, for example, one or more of a communications controller, receiver, transceiver, transmitter, port, conductors, software and/or hardware for communicating data. Similarly, the machine learning computing system 1130 can include a network interface 1164.

The network(s) 1180 can be any type of network or combination of networks that allows for communication between devices. In some embodiments, the network(s) can include one or more of a local area network, wide area network, the Internet, secure network, cellular network, mesh network, peer-to-peer communication link and/or some combination thereof and can include any number of wired or wireless links. Communication over the network(s) 1180 can be accomplished, for instance, via a network interface using any type of protocol, protection scheme, encoding, format, packaging, etc.

FIG. 11 illustrates one example computing system 1100 that can be used to implement the present disclosure. Other computing systems can be used as well. For example, in some implementations, the computing system 1102 can include the model trainer 1160 and the training dataset 1162. In such implementations, the machine-learned models 1110 can be both trained and used locally at the computing system 1102. As another example, in some implementations, the computing system 1102 is not connected to other computing systems.

In addition, components illustrated and/or discussed as being included in one of the computing systems 1102 or 1130 can instead be included in another of the computing systems 1102 or 1130. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

Computing tasks discussed herein as being performed at computing device(s) remote from a vehicle/system can instead be performed at a vehicle/system (e.g., via the vehicle computing system), or vice versa. Such configurations can be implemented without deviating from the scope of the present disclosure.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method, the method comprising:
    obtaining, by a computing system comprising one or more computing devices, data indicative of a training scene comprising a plurality of three-dimensional scene datapoints representing an environment;
    identifying, by the computing system, a target object within the training scene, wherein the target object is represented by a plurality of three-dimensional target object datapoints;
    obtaining, by the computing system, an adversarial object represented by a plurality of three-dimensional adversarial object datapoints;
    determining, by the computing system, an adversarial location for the adversarial object within the training scene based, at least in part, on the target object;
    generating, by the computing system, data indicative of a modified training scene based, at least in part, on the training scene, the target object, the adversarial object, and the adversarial location, wherein the modified training scene comprises a three-dimensional representation of the adversarial object on the target object;
    inputting, by the computing system, the data indicative of the modified training scene to a machine-learned object detection model; and
    determining, by the computing system, a detection score associated with the modified training scene based, at least in part, on an output of the machine-learned object detection model.

2. The computer-implemented method of claim 1, wherein the detection score is indicative of a confidence score of the machine-learned object detection model in detecting the target object.

3. The computer-implemented method of claim 1, wherein obtaining the adversarial object comprises:
    obtaining, by the computing system, a mesh representation of the adversarial object; and
    rendering, by the computing system, the mesh representation of the adversarial object into the plurality of three-dimensional adversarial object datapoints.

4. The computer-implemented method of claim 3, wherein the three-dimensional adversarial object datapoints are rendered three-dimensional LIDAR points.

5. The computer-implemented method of claim 1, further comprising:
    updating, by the computing system, one or more model parameters of the machine-learned object detection model based at least in part on the detection score.

6. The computer-implemented method of claim 1, further comprising:
    updating, by the computing system, one or more three-dimensional adversarial object parameters associated with the adversarial object based, at least in part, on the detection score, wherein the one or more three-dimensional adversarial object parameters are updated to minimize the detection score.

7. The computer-implemented method of claim 1, wherein the three-dimensional representation of the adversarial object comprises the plurality of three-dimensional adversarial object datapoints localized within the training scene.

8. The computer-implemented method of claim 7, wherein generating the modified training scene comprises:
    generating, by the computing system, a union of at least a subset of the plurality of three-dimensional scene datapoints and at least a subset of the plurality of three-dimensional adversarial object datapoints.

9. The computer-implemented method of claim 1, wherein determining the adversarial location comprises:
    fitting, by the computing system, one or more target object representations to a point cloud associated with the target object; and
    identifying, by the computing system, the adversarial location based, at least in part, on the one or more target object representations.

10. The computer-implemented method of claim 1, wherein determining the adversarial location for the adversarial object within the training scene comprises:
    obtaining, by the computing system, a plurality of training object representations, each training object representation defined by a plurality of three-dimensional training object parameters;
    generating, by the computing system, a target object representation defined by a plurality of three-dimensional target representation parameters by comparing the plurality of three-dimensional target object datapoints to the plurality of three-dimensional training object parameters of one or more of the training object representations; and
    identifying, by the computing system, the adversarial location for the adversarial object based, at least in part, on the target object representation.

11. The computer-implemented method of claim 1, wherein the target object comprises a vehicle within the training scene, wherein the adversarial location comprises a roof of the vehicle, and wherein the adversarial object is located on the roof of the vehicle.

12. The computer-implemented method of claim 1, further comprising
    selecting, by the computing system, the target object from one or more training objects within the training scene.

13. The computer-implemented method of claim 12, wherein the target object is randomly selected from the one or more training objects within the training scene.

14. The computer-implemented method of claim 12, wherein the machine-learned object detection model is configured to detect the one or more training objects within the training scene.

15. The computer-implemented method of claim 1, wherein determining the detection score comprises:
determining, by the computing system, that the machine-learned object detection model did not detect the target object within the modified training scene based at least in part on the output of the machine-learned object detection model; and
in response to determining that the machine-learned object detection model did not detect the target object, lowering, by the computing system, the detection score.

16. A computing system comprising:
one or more processors; and
one or more non-transitory computer-readable media that collectively store instructions that, when executed by the one or more processors, cause the computing system to perform operations, the operations comprising:
obtaining data indicative of a training scene comprising a plurality of three-dimensional scene datapoints representing an environment;
identifying a target object within the training scene, wherein the target object is represented by a plurality of three-dimensional target object datapoints;
obtaining an adversarial object represented by a plurality of three-dimensional adversarial object datapoints;
determining, by the computing system, an adversarial location for the adversarial object within the training scene based, at least in part, on the target object;
generating data indicative of a modified training scene based, at least in part, on the training scene, the target object, the adversarial object, and the adversarial location, wherein the modified training scene comprises a three-dimensional representation of the adversarial object on the target object;
determining a detection score by inputting the modified training scene to a machine-learned object detection model; and
training the machine-learned object detection model based, at least in part, on the detection score.

17. The computing system of claim 16, wherein determining the detection score by inputting the modified training scene to the machine-learned object detection model comprises:
obtaining a detection output indicative of one or more detected training objects represented by the modified training scene as an output of the machine-learned object detection model;
determining that the one or more detected training objects do not include the target object; and
in response to determining that the one or more detected training objects do not include the target object, lowering the detection score.

18. The computing system of claim 16, wherein the machine-learned object detection model comprises one or more deep neural networks, and wherein the one or more deep neural networks are trained to maximize the detection score.

19. A computing system, comprising:
a training database comprising scene data and data indicative of an adversarial object, wherein the scene data comprises a plurality of training scenes, each training scene comprising a plurality of three-dimensional datapoints representing an environment;
a machine-learned object detection model configured to receive a respective training scene of the plurality of training scenes, and in response to receipt of the respective training scene, output a respective detection output indicative of one or more training objects within the respective training scene;
a memory that stores a set of instructions; and
one or more processors which are configured to use the set of instructions to:
obtain data indicative of a first training scene and the adversarial object from the training database;
identify a first target object within the first training scene;
determine a first adversarial location for the adversarial object within the first training scene based, at least in part, on the first target object;
generate a first modified training scene based, at least in part, on the first training scene, the first training object, the adversarial object, and the first adversarial location, wherein the first modified training scene comprises a three-dimensional representation of the adversarial object on the first target object within the first training scene;
determine a detection score by inputting the first modified training scene to the machine-learned object detection model; and
generate an updated adversarial object by updating one or more of a plurality of adversarial object parameters of the adversarial object based, at least in part, on the detection score.

20. The computing system of claim 19, wherein the one or more processors are further configured to:
obtain data indicative of a second training scene and the updated adversarial object from the training database;
identify a second target object within the second training scene;
determine a second adversarial location for the updated adversarial object within the second training scene based, at least in part, on the second target object;
generate a second modified training scene based, at least in part, on the second training scene, the second target object, the updated adversarial object, and the second adversarial location, wherein the second modified training scene comprises a three-dimensional representation of the updated adversarial object on the second target object within the second training scene;
determine a second detection score by inputting the second modified training scene to the machine-learned object detection model; and
train the machine-learned object detection model based, at least in part, on the second detection score.

* * * * *